United States Patent
Kandekar

(10) Patent No.: US 10,223,517 B2
(45) Date of Patent: Mar. 5, 2019

(54) GESTURE-TO-PASSWORD TRANSLATION

(71) Applicant: Kunal Kandekar, Jersey City, NJ (US)

(72) Inventor: Kunal Kandekar, Jersey City, NJ (US)

(73) Assignee: Kunal Kandekar, Jersey City, NJ (US)

( * ) Notice: Subject to any disclaimer, the term of this patent is extended or adjusted under 35 U.S.C. 154(b) by 418 days.

(21) Appl. No.: 14/251,639

(22) Filed: Apr. 13, 2014

(65) Prior Publication Data
US 2014/0310805 A1  Oct. 16, 2014

Related U.S. Application Data
(60) Provisional application No. 61/811,805, filed on Apr. 14, 2013.

(51) Int. Cl.
G06F 21/32   (2013.01)
G06F 21/36   (2013.01)
H04L 29/06   (2006.01)

(52) U.S. Cl.
CPC ............. *G06F 21/36* (2013.01); *G06F 21/32* (2013.01); *H04L 63/083* (2013.01); *H04L 63/0861* (2013.01)

(58) Field of Classification Search
CPC ........ G06F 21/31; G06F 21/316; G06F 21/32; H04L 63/083; H04L 63/0861
See application file for complete search history.

(56) References Cited

U.S. PATENT DOCUMENTS

| | | | | |
|---|---|---|---|---|
| 6,941,001 B1* | 9/2005 | Bolle | ............... | G06F 1/1616 382/115 |
| 9,165,159 B1* | 10/2015 | McDonnell | ......... | G06F 21/6218 |
| 9,430,634 B1* | 8/2016 | Dotan | ................ | H04L 63/083 |
| 2002/0109677 A1* | 8/2002 | Taylor | ................ | G06F 3/0233 345/173 |
| 2009/0165121 A1* | 6/2009 | Kumar | ................ | G06F 21/316 726/19 |
| 2010/0197352 A1* | 8/2010 | Runstedler | ............ | G06F 3/0233 455/566 |
| 2012/0159599 A1* | 6/2012 | Szoke | ................ | G06F 21/35 726/7 |
| 2014/0082694 A1* | 3/2014 | Sanghavi | ............... | G06F 21/31 726/3 |
| 2014/0129974 A1* | 5/2014 | Ben-Harrush | ........ | G06F 3/0484 715/781 |
| 2014/0310764 A1* | 10/2014 | Tippett | ................ | G06F 21/31 726/1 |

* cited by examiner

*Primary Examiner* — Daniel B Potratz

(57) ABSTRACT

Systems and methods related to advanced user experiences and interactions with devices are disclosed, specifically, for translating gesture inputs to text manipulation actions to facilitate password input on mobile devices. In one embodiment, a device detects the presence of a password input field on a user interface; receives user inputs from means such as a touchscreen; recognizes gestures based on the user inputs; determines text manipulation actions associated with recognized gestures; and applies the determined text manipulation actions to the contents of the password input field for each recognized gesture.

18 Claims, 12 Drawing Sheets

GESTURE-TO-PASSWORD TRANSLATION

CROSS-REFERENCE TO RELATED APPLICATIONS

This application claims the benefit of U.S. Provisional Patent Application No. 61/811,805, filed Apr. 14, 2013, the disclosure of which is incorporated herein by reference.

TECHNICAL FIELD

The subject matter described herein relates to user experiences on mobile devices equipped with sensors for physical input such as touch and movement. More particularly, the subject matter described herein relates to methods, systems, and computer readable media for interpreting physical inputs such as gestures and translating them into text manipulation commands to facilitate password input.

BACKGROUND

Modern mobile devices are technological marvels, containing powerful computing, communication, interaction and sensing capabilities within a compact, lightweight package. A large and continuously increasing number of newer sensor inputs are available to mobile devices, including accelerometers, gyroscopes, magnetometers, proximity sensors, GPS sensors, touch screens, light sensors, speakers, multiple microphones, multiple cameras and even barometers. They enable a wealth of varied and diverse means of use, most of which are relatively unexplored. Yet user interaction with these devices still follows rather conventional means despite the advent of touch screen-based user interfaces, using old paradigms such as pointers, icons, keyboards, files and text-based interactions.

Hence there is an opportunity to enable advanced user interactions and improved experiences by using more natural means using the wealth of sensory and contextual information provided by various on-device sensors and the computational, communication and other resources available to modern devices.

On the other hand, the vast majority of the current information and computing infrastructure, mainly current operating systems, operating environments, graphical user interfaces, various native applications, browser-based web applications, the Internet and the World Wide Web, are still limited to older, non touch-based, primarily text-driven user interfaces. Hence there is also a need to bridge the natural user interactions enabled by modern mobile devices with the conventional interactions primarily based on text, icons and menus supported by existing interfaces.

SUMMARY

Disclosed herein are systems and methods to address the opportunities and needs identified in the previous section. Systems and methods related to advanced user experiences and interactions for mobile devices are disclosed.

More specifically, systems and methods related to translating gesture inputs to text manipulation commands are disclosed. In one embodiment, a mobile device detects the presence of a password input field on a User Interface (UI), such as a Graphical User Interface (GUI), and enables the user to enter a password using gestures by receiving user inputs by means such as touchscreens; recognizing gestures based on the received user inputs; and applying to the password input field a text manipulation action associated with each gesture, where the association of gestures to the text-manipulation actions is pre-configured.

In one embodiment, a text-manipulation action may comprise appending a text fragment to the contents of a password input field. A user may hence divide a password into two or more fragments, and assign a gesture for the text manipulation action of appending each of the fragments to the current contents of a password input field. The user may then perform password input by performing, in appropriate sequence, the gestures corresponding to each password fragment, such that when the text manipulation actions corresponding to the gestures are applied to the password input field, the final state of the password input field may contain the original password. In other embodiments more sophisticated text manipulation actions may be used.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Preferred embodiments of the subject matter described herein will now be explained with reference to the accompanying drawings of which.

DETAILED DESCRIPTION

Figure 1:
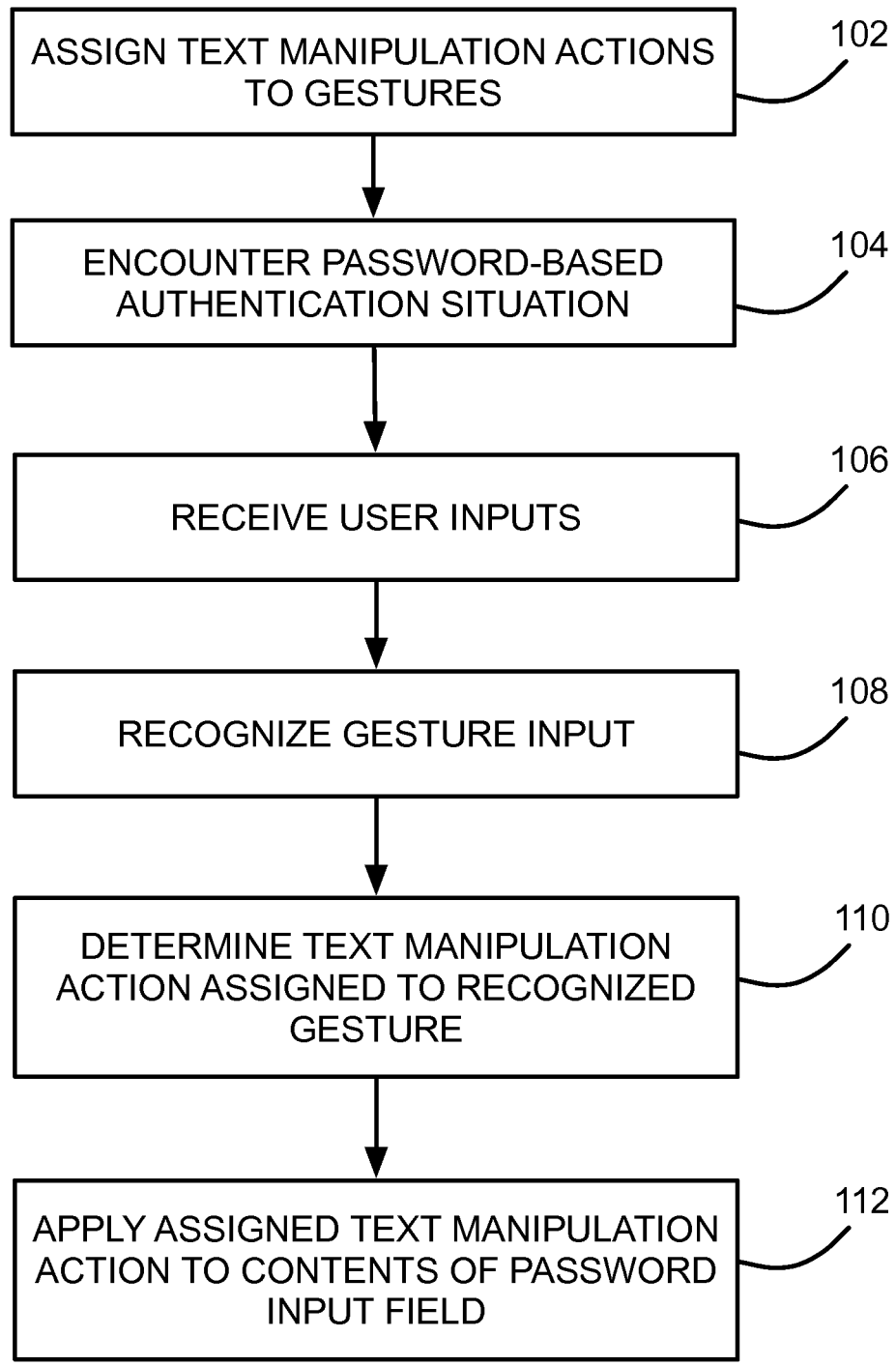
FIG. 1 depicts a flowchart that illustrates broadly the steps involved in the operation of one embodiment of the system.

The subject matter herein describes in detail the methods and systems for detecting user gestures on devices and translating them into password inputs or other text manipulation actions.

As referred to herein, the term "device" or "electronic device" should be broadly construed. It can include any type of device capable of presenting a graphical user interface to a user and receiving input from the user. For example, an electronic device may be a mobile device such as, for example, but not limited to, a smart phone, a cell phone, a pager, a personal digital assistant (PDA, e.g., with GPRS NIC), a mobile computer with a smart phone client, or the like. An electronic device can also include any type of conventional computer, for example, a desktop computer or a laptop computer. A typical mobile device is a wireless data access-enabled device (e.g., an iPhone® smart phone, a Blackberry® smart phone, a Nexus One™ smart phone, a Nokia Lumia® smartphone or the like, an iPad® device) that is capable of sending and receiving data in a wireless manner using protocols like the Internet Protocol, or IP, and the wireless application protocol, or WAP. This allows users to access information via wireless devices, such as smart phones, mobile phones, pagers, two-way radios, communicators, and the like. Wireless data access is supported by many wireless networks, including, but not limited to, CDPD, CDMA, GSM, PDC, PHS, TDMA, FLEX, ReFLEX, iDEN, TETRA, DECT, DataTAC, Mobitex, EDGE and other 2G, 3G, 4G and LTE technologies, and it operates with many handheld device operating systems, such as PalmOS, EPOC, Windows CE, FLEXOS, OS/9, JavaOS, iOS, Android and Windows Phone. Typically, these devices use graphical displays and can access the Internet (or other communications network) on so-called mini- or micro-browsers, which are web browsers with small file sizes that can accommodate the reduced memory constraints of wireless networks. In a representative embodiment, the mobile device is a cellular telephone or smart phone that operates over GPRS (General Packet Radio Services), which is a data technology for GSM networks. In addition to a conventional voice communication, a given mobile device can communicate with another such device via many different types of message transfer techniques, including SMS (short message service), enhanced SMS (EMS), multi-media message (MMS), email WAP, paging, or other known or later-developed wireless data formats. Although many of the examples provided herein are implemented on a mobile device, the examples may similarly be implemented on any suitable electronic device, such as a computer or an e-book reader. The device may be an e-book reader configured to present an e-book to a user. Example e-book readers include, but are not limited to, the KINDLE® and NOOK® e-book readers. Further, the device may be a personal computer of any form factor, such as a desktop, laptop, tablet or a hybrid thereof, running any capable operating system such as Windows, Mac OS, Linux, and the like.

As referred to herein, a "user interface" (UI) is generally a system by which users interact with an electronic device. An interface can include an input for allowing users to manipulate an electronic device, and can include an output for allowing the system to present information (e.g. textual, audio, video, web or e-book content) and/or data, indicate the effects of the user's manipulation, etc. An example of an interface on an electronic device includes a graphical user interface (GUI) that allows users to interact with programs in more ways than typing. A GUI typically can offer display objects, and visual indicators, as opposed to text-based interfaces, typed command labels or text navigation to represent information and actions available to a user. For example, an interface can be a display window or display object, which is selectable by a user of a mobile device for interaction. The display object can be displayed on a display screen of an electronic device and can be selected by and interacted with by a user using the interface. In an example, the display of the electronic device can be a touchscreen, which can display the display icon. The user can depress the area of the display screen at which the display icon is displayed for selecting the display icon. The touchscreen may be "multitouch-enabled", whereby it may be able to detect multiple simultaneous touch inputs. In another example, the user can use any other suitable interface of a mobile device, such as a keypad, to select the display icon or display object. For example, the user can use a track ball or arrow keys for moving a cursor to highlight and select the display object.

Operating environments in which embodiments of the present disclosure may be implemented are also well known. In a representative embodiment, a mobile electronic device, such as a smartphone, is connectable (for example, via WAP) to a transmission functionality that varies depending on implementation. Thus, for example, where the operating environment is a wide area wireless network (e.g., a 2.5G network, a 3G network, a 4G network, or an LTE network), the transmission functionality comprises one or more components such as a mobile switching center (MSC) (an enhanced ISDN switch that is responsible for call handling of mobile subscribers), a visitor location register (VLR) (an intelligent database that stores on a temporary basis data required to handle calls set up or received by mobile devices registered with the VLR), a home location register (HLR) (an intelligent database responsible for management of each subscriber's records), one or more base stations (which provide radio coverage with a cell), a base station controller (BSC) (a switch that acts as a local concentrator of traffic and provides local switching to effect handover between base stations), and a packet control unit (PCU) (a device that separates data traffic coming from a mobile device). The HLR also controls certain services associated with incoming calls. Of course, embodiments in accordance with the present disclosure may be implemented in other and next-generation mobile networks and devices as well. The mobile device is the physical equipment used by the end user, typically a subscriber to the wireless network. Typically, a mobile device is a 2.5G-compliant device, 3G-compliant device, or 4G-compliant device that includes a subscriber identity module (SIM), which is a smart card that carries subscriber-specific information, mobile equipment (e.g., radio and associated signal processing devices), a user interface (or a man-machine interface (MMI), and one or more interfaces to external devices (e.g., computers, PDAs, and the like). The electronic device may also include a memory or data store.

Gesture-to-Password Translation

In one embodiment of the present invention, a mobile device detects the presence of a password input field on the UI, and enables the user to enter a password using gestures by applying a pre-associated text-manipulation action to the password for each gesture. A typical text-manipulation action may be the substitution or entry of a fragment of the password at the current cursor position. As such, the invention may be described as a form of gesture-based stenography for password input.

The problem is that conventional passwords or, in general, conventional authentication mechanisms are primarily based on providing text-based credentials, and text entry on modern mobile devices, which typically depend on a touchscreen as the primary method of user input, makes it rather difficult for password input. Touchscreen-based text input in general is difficult, but password entry is often more so. Input of text is typically via a "virtual keyboard" or a "soft keyboard", which essentially works by displaying a "visual" keyboard comprising multiple images representing discrete keys, each of which maps to a separate character, and users touch the "keys" on the touchscreen to specify each subsequent character they intend to input. Since space available on most mobile device touchscreens is limited, only a subset of the total available keys are typically displayed at a time, and special "modifier" or "selector" keys are provided alongside the character keys to enable the user to switch between different subsets of the entire available character set. For instance, many virtual keyboards by default depict a keyboard with only the alphabetic subset of the entire character set (i.e. A-Z for an English language keyboard), and on selecting a modifier key, the keyboard is replaced by another subset of characters, such as numeric characters and commonly used arithmetic operators (1-9, =, +, −, x, etc.), are displayed instead. The user may then input numeric characters by touching the keys on the adjusted virtual keyboard, and may subsequently hit the modifier key again to go back to alphabetic input, or select yet another subset of characters to input (such as less frequently punctuation, such as underscores and ellipsis.)

Thus password input is especially bothersome because often the more secure passwords are a combination of letters, numbers and special characters, which requires a frequent switching between various character sets. To this end, the present invention provides a solution whereby input of conventional text-based passwords on a touchscreen can be facilitated by means of using gestures, which are significantly more convenient to perform on touchscreens.

As discussed herein, the system and method may be implemented as a standalone software application or a component thereof, a client-side script executed in a browser as part of a web application, a browser extension, a firmware component of the device, or any combination thereof. As such, while the subsequent description is in terms of a system performing these steps, sometimes referred to as the "gesture-to-password translation system", the invention is not limited thereto, and these steps may instead be performed by one or more components implemented in software, firmware or hardware.

FIG. 1 depicts a flowchart that illustrates broadly the steps involved in the operation of one embodiment of the system. The following paragraphs discuss the figure and the steps in detail. Note that the steps discussed need not necessarily be performed in the order that they are discussed, and where it makes sense to do so, the order of steps may be interchanged, or certain steps may be optional and skipped completely, or certain additional steps may be performed to achieve or facilitate the necessary functions discussed herein.

First, the user assigns password fragments or text manipulation actions to selected gestures (step 102). This may be done in a number of ways. In one embodiment, the user first selects one or more gestures. For security reasons discussed in detail subsequently, the user may preferably select at least three gestures. Gestures may be determined from touch-based inputs (such as from a touch-screen or touchpad via the user's finger or a stylus) or movement-based inputs (such as from an accelerometer, proximity sensor, or a mouse peripheral). Gestures may be selected from a predetermined selection of gestures, or created anew by a user, or a combination of the two. Gestures may even be recommended by the system to the user based on various criteria.

The user may then divide the password into a number of password fragments corresponding to the number of gestures selected, which may be combined to reconstruct the password. More generally, the user may divide the password into one or more password fragments or text manipulation actions, which, when taken and combined together, would result in the original password. The use of a password fragment in combination to reconstruct a password may be considered an instance of a text manipulation action comprising appending the given password fragment to a given text content, such as the contents of a password field.

Text manipulation actions may include various actions that may be applied to a given text field to manipulate the contents in a pre-configured, deterministic manner. These actions may be pre-configured by the system, or configured by the user, or a combination of both. Text manipulation actions may act on selected individual characters, or groups of characters, that comprise the given text content of the password input field. As used herein, characters may include alphanumeric characters as well as special characters as well as symbols, such as those representing characters in other languages. Characters may be represented either by ASCII, Unicode or other text encoding methods. Example text manipulation actions may include (but are not limited to):

Appending a given fragment of the password to the current text content;

Changing the case of the first letter, alternate letters, or selected letters of the text contents, either from uppercase to lowercase or vice versa;

Substituting selected characters or numbers in the given text with other selected characters or numbers;

Changing the order of the characters in the text contents or subsections of the text contents.

Changing the location of the current cursor position to another position in the given text contents.

Removing or adding characters are one or more positions in the text contents.

Undoing the previous text manipulation or text appending action.

Note that this invention may apply to various types, representations and encodings of text, such as ASCII or Unicode, in any number of languages.

The user may then assign a gesture to each of the password fragments or text manipulation actions. The system may then associate the assigned gesture with the corresponding text manipulation action. Thus, in this embodiment, the user determines the assignment of the password fragment or text manipulation action to the gesture (or vice versa). Note that this order is interchangeable, and the user may instead first divide the password into multiple fragments (or a series of text manipulation actions) and then select and assign a gesture to each part, as opposed to first selecting one of more gestures and then assigning password fragments to each gesture (either manually or automatically). The user may determine how the password is divided and assigned to each gesture, and the division may be arbitrary, or may be based on system-generated recommendations.

Alternatively, a text password may first be provided to the system, which may automatically then divide the password into a number of fragments corresponding to a number of gestures selected by the user of pre-configured by the system. The system may divide the given password automatically, either arbitrarily or based on various criteria, and may then notify the user of how the password has been divided. The system may also estimate the strength of the password and recommend a better password be selected. The user may then proceed to assign a gesture-to-text manipulation mapping for each fragment manually, or the system could do so itself and inform the user of the mapping as well as the sequence of gestures to be used for that password. The user may then edit and save the system-recommended mapping and sequence of gestures as desired.

In some embodiments, the system may generate the text-based password itself, rather than being provided one by the user, and it may then proceed to split and map fragments to gestures as before. As such, the user may only ever need to know the sequence of gestures. This approach may be used, for instance, in password managers, discussed subsequently.

The system may associate each assigned gesture with each text manipulation action via a gesture-to-text manipulation mapping data structure, which stores which gesture is assigned to each password fragment, or vice versa. This mapping may be an associative data structure such as a hashtable, which may be stored in memory and may also be persisted to permanent storage such as disks, Solid State Drives (SSD), flash memory, or EEPROMs. The system may subsequently use this association to determine the text manipulation action to perform on a given text or password field when a certain gesture is detected. The system should preferably maintain and store the gesture-to-text manipulation action mapping in a secure manner.

Thus, in this manner, gestures may be assigned to "actions" rather than textual words, text fragments or password fragments, whereby actions manipulate the contents of the password input field. In fact, as mentioned above, the action of appending a given text or password fragment to the given text contents, such as the contents of a password input field, may also be considered just another text manipulation action. Any other number of actions may be configured. For instance, a "backspace" action may be configured, whereby the corresponding gesture and action causes the pre-configured number of previously entered password fragment characters to be deleted. Another action, for instance, may be a "place cursor" action whereby the "cursor" is placed at a preconfigured offset in the password constructed so far, and all subsequent password fragments are placed at that offset. Another action may swap or jumbled letters at specified positions. Another action may change a selected or pre-configured fragment from lowercase to uppercase, or vice versa. Another action may substitute a given fragment with another. Yet another action may be configured simply to trigger the submission of the credentials including the constructed password value for authentication, so that the user may not have to click on any button or other element in the GUI to cause the credentials to be submitted.

Additionally, arbitrary textual fragments and text manipulation actions may be generated and assigned (randomly) as decoys to the other unassigned or newly generated gestures. This is so that even if an attacker gains unrestricted, unencrypted access to the mapping data structure, it would not be instantly obvious what the password is simply by looking at the limited set of password fragments or text manipulation actions actually assigned to gestures by the user. Hence these "decoy assignments" serve to make it less obvious which gesture-to-text manipulation assignments need to be used to actually construct a valid password. Alternatively, the system may be initialized in a state where all pre-configured and newly configured gestures are assigned to random text fragments or text manipulation actions, and assignments for specific gestures are overwritten when the user assigns the intended password fragments or text manipulation actions to those gestures.

These decoy fragments and text manipulation actions may be generated based on a number of criteria, which could be pre-configured or configured by the user. In one embodiment, the decoy fragments and text manipulation actions may be generated based on the text fragments and text manipulation actions assigned by the user, e.g. to make the decoys look more similar to those assigned by the user. This may make it more difficult for an attacker, even if access to the gesture-to-text associations is achieved, to differentiate actual password text fragments and manipulation actions from the decoys. For instance, the assigned text fragments may be analyzed to detect the distribution of uppercase characters, lowercase characters, special characters, and numbers, and the same distribution of uppercase characters, lowercase characters, special characters, and numbers may be used for the decoys.

The system may also store the context in which the mapping is to be used, for example the username or account with which the password is being associated, and the website, service, application, document, and the like, or any other resource being authenticated against or secured. This context matching is discussed further subsequently.

Once the gesture-to-text manipulation configuration is completed, the user may then proceed to use the device as usual.

The system may then detect, as part of normal usage of the device or application by the user, that the user has encountered a password-based authentication situation (step 104). This may be achieved, for instance, by detecting the presence of a password input field in a webpage, such as by invoking the getElementsByTagName method on the DOM object for the "password" tag. Alternatively, instead of actively detecting it, the system may be passively notified of the password-based authentication situation, for instance by the application presenting the password input field. As an example, the gesture-to-password translation system may be implemented as a shared library or a background service, and the user application may be programmed to invoke the gesture-to-password translation function via the shared library or background service by means such as an Application Programmer Interface (API), whenever presenting or otherwise implementing a password-based authentication scheme. In this manner, the gesture-to-password translation system may not need to be actively monitoring currently running applications to detect the presence of password input fields.

On detecting a password-based authentication situation, the system initiates a gesture-based password input mode (step 106). In this mode, the system may then begin tracking and receiving user inputs from various sources available to the device, such as touch events and gestures made via touch inputs detected on the touchscreen or touchpad, movement inputs detected via accelerometer, pointer inputs detected via a mouse peripheral, or key inputs via a hardware keyboard, and the like. Touch events or touch inputs may be detected anywhere on the touch screen display area, or within specific locations on the GUI displayed on the touch screen display, as discussed in detail subsequently. Further, the system may initiate the password input field to an empty value. In addition or alternatively, the system may initiate a "constructed password" field in memory to an empty value. Note that as the constructed password field and the password input field may be manipulated identically and may hence contain identical values at any given step, they may be used interchangeably going forward (except where noted otherwise). Alternatively, it may initiate either or both of the input field and constructed password field to a preset initial value. Alternatively, if the password input field is already populated, it may initiate the constructed password value to the value of the password input field.

The system may then attempt to recognize gestures, if any, from the received user inputs (step 108). Any of the several gesture recognition or gesture detection methods known in the art may be used. This step may largely involve processing the plurality of received user input readings provided via devices sensors such as the touchscreen, touchpad, accelerometer, mouse, keyboard or other sensors and peripherals, and using any of the gesture recognition methods known in the art to identify a discrete gesture that these inputs constitute. This is needed because these sensors typically provide inputs to the device CPU in the form of unstructured analog sensor readings, and the system must make sense of these readings to determine which gesture has been performed. For instance, the inputs from a touchscreen or touchpad or mouse gesture may be a series of 2-dimensional coordinates or vectors, whereas the inputs from an accelerometer may be 3-dimensional coordinates or vectors. In any case, the system must analyze and interpret these coordinates to determine which gesture or shape they constitute. As a very simple example, input coordinates that are approximately equidistant from a given point may be recognized to constitute a circular gesture. However, much more sophisticated methods may be used to detect a much wider variety of gestures, including pattern recognition, machine learning methods, neural networks, statistical or stochastic methods, Bayesian networks, Hidden Markov Models, Support Vector Models, and the like. Note that some devices may perform this recognition at a lower level, such as in a device driver, rather than at the application layer.

In one embodiment, for touch-based inputs in a web-based document, the $1 Unistroke Recognizer may be used, which is described in the paper by Wobbrock et al, "Gestures without Libraries, Toolkits or Training: A $1 Recognizer for User Interface Prototypes", Proceedings of the 20th Annual ACM Symposium on User interface Software and Technology, 2007, and the various references therein. Alternatively, multi-stroke recognizers may also be used. The detection method used may depend on the type of gesture input (e.g. touch-based vs. movement-based). A combination of touch and movement inputs (and corresponding detection methods) may be used.

In addition or alternatively, the received gesture inputs may be compared with a collection of detectable pre-configured (either system-configured or user-configured) gestures stored in the system, and the closest match may be selected as the detected gesture. In one embodiment, the pre-configured gestures may be stored as a 1-dimensional, 2-dimensional or 3-dimensional matrix of coordinates or vectors, depending on the type of gesture inputs (e.g. touch-screen versus accelerometer). Alternatively, a 2-dimensional series may potentially be stored as an image. Gesture recognition may then be performed by correlating the received gesture input coordinates with the pre-configured gesture coordinates, and selecting the pre-configured gesture whose coordinates have the highest correlation with the received gesture inputs. Methods such as FFT-based correlation and normalized cross correlation may be used to determine correlation. Note that to speed up gesture recognition, the coordinates of all preconfigured gestures may be collected in a single matrix or vector of coordinates and the received gesture inputs may be correlated against the combined vector. Alternatively, the received gesture inputs and preconfigured gesture coordinates may be normalized to the same given bounds, and then the normalized coordinates of the received gesture input may be compared with the normalized coordinates of each of the preconfigured gestures, and for each comparison an error function may be calculated, and the preconfigured gesture having the smallest error function with the received gesture inputs may be selected as the detected gesture.

On recognizing which gesture has been made by the user, the system may then determine the text manipulation action associated with (or "mapped to") that gesture by looking up the detected gesture in the associative gesture-to-text manipulation action data structure (step 110). Looking up the detected gesture in the associative data structure may entail using unique identifiers to identify each recognizable gesture and looking up the identifier that uniquely identifies the detected gesture in the associative data structure.

On determining the text manipulation action assigned to the recognized gesture, the system may then apply the text manipulation action to the current contents of the password input field, or the current value of the constructed password field in memory, or both (step 112).

Steps 110 and 112 may be repeated for each gesture performed by the user that may be detected and recognized by the system, such that the text manipulation action associated with each successive gesture is applied to the constructed password field, and hence the password value is changed or incrementally constructed with each successive gesture. One case where a text manipulation action may not be applied is, for instance, if a decoy gesture is performed.

The user, on determining that the appropriate gestures have been made, may then cause the resulting password value in the password input field or in the constructed password field in memory by these steps to be submitted for verification to the authentication system. The user may, for instance, touch a "login" button, or press the "enter" key, which may in turn cause an appropriate HTTP or HTTPS POST request to be submitted with the corresponding credential parameters, in the case that the service the user is authenticating against is a website. Alternatively, the system may cause submission of the password on detecting that password input is complete by other means, such as the length of the constructed password reaching a pre-configured length, or the cryptographic hash of the constructed password matching a pre-configured value.

Note that gesture-mapped password input may be used in conjunction with normal textual password input. That is, a user may enter a few fragments or construct part of the password via gestures, and may then insert a few symbols manually via a keyboard, and may complete the password using other gestures. This may enhance security by avoiding keeping all portions of the password along with the mapping configuration data, so that even if the mapping data is compromised, an attacker may still not have access to all fragments of the password.

Thus the system enables convenient gesture-based input of passwords for authentication systems that only accept conventional textual (or other non-textual) passwords.

Further, note that while the description so far has discussed mapping gestures to fragments of textual passwords, the same method could be applied to other non-text password inputs, such as, e.g. symmetric or asymmetric cryptographic keys, authentication tokens, binary authentication data, and the like.

User Interface Aspects

The present invention also comprises presentation and user interface aspects. The subsequent sections will refer to the corresponding figures while discussing these aspects. Note that while these figures and discussions are in the context of touchscreen or multitouch inputs, the invention is not intended to be limited to those inputs and should apply to all other manners of gesture input.

Figure 2:
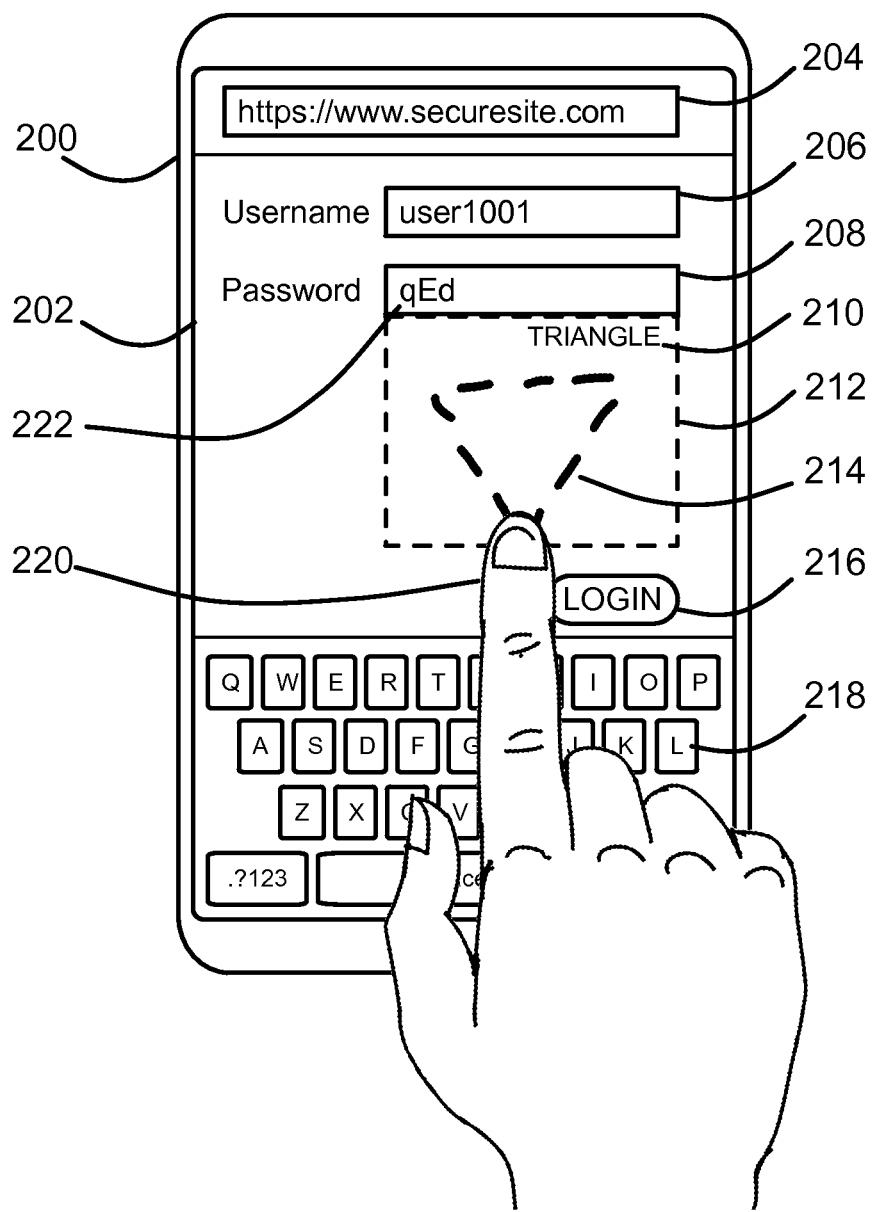
FIG. 2 depicts the use case of a user performing password input via gestures on a mobile device.

FIG. 2 depicts the use case of a user performing password input via gestures on a mobile device. FIG. 2 shows a mobile device 200, with a touchscreen display displaying a Graphical User Interface (GUI) 202. The mobile device 200 is currently running a web browser application, and the GUI on the touchscreen display 202 is the GUI for the browser application. The GUI depicts a typical log-in page for a website, and comprises browser URL bar 204, a username text field 206, a password input field 208, a login button 216, and a virtual or a "soft" keyboard 218 which may be used for conventional text input.

At the time of password entry, the system may indicate to the user that gestures may be used to enter or manipulated a password using visual elements on the GUI. A "gesture input area" 212 may be presented on the GUI to identify the bounds within which touch inputs are to be made for the system to correctly detect gestures. This may be, for instance, an overlay in an area adjacent to or near the password input field 208. For various implementations, additional methods may be needed to accurately receive and detect inputs that constitute gestures. For instance, when implemented as an element in a webpage displayed on a touchscreen display, the touch events may need to be handled specially so as not to cause unintended side effects that may result in poor user experiences and/or incorrect gestures being detected. For instance, the scrolling effects caused by sliding touch events may need to be suppressed when touch events are received within the gesture input area 212, so that the entire displayed page does not scroll along with the user's touch events when the user is attempting to input a gesture.

Note that while it is depicted here to be a plain area, which may be implemented as, for example, an empty canvas element in a webpage, the gesture input area 212 may alternatively present other visual elements and enabled other, more structured forms of gesture input. For instance, instead of allowing free-form gestures, the gesture input area 212 may present a regular grid of points, and gestures may only be performed by tracing lines that pass through points within that grid, "connecting the dots" so to speak. Note that this may affect the type of gestures that may be configured and used in previous and subsequent procedures, such as during assigning gestures to text manipulation actions as in step 102 of FIG. 1, or while performing gestures during authentication as in steps 106 and 108 of FIG. 1.

Alternatively, the gesture input area may coincide with the display area of the virtual keyboard (or "soft keyboard") that is typically used for text input. That is, the gestures may be input and detected within the same area of the touchscreen that is used for discrete alphabetic input. As such, a method is required to differentiate discrete keyboard input from gesture input based on touch input on the same touchscreen. This gesture/discrete input differentiator method is detailed subsequently.

After each gesture is detected, the system may display, in a location 210 within the gesture input area 212 or in an overlay adjacent to or area near the password input field 208, one of more of the following as visual feedback:

A name or visual depiction of the gesture detected (in one embodiment, as depicted by 210 in FIG. 2, whereby a triangle gesture 214, depicted by dotted lines and performed by the user's finger 220, has been detected);

The clear text of the password fragment mapped to the gesture detected and appended to the constructed value (in one embodiment, as depicted by the characters 222 within the password input field 208); Note that this may be displayed only briefly;

The number of characters or other symbols in the password fragment mapped to the gesture detected and appended to the constructed value (not depicted);

The percentage of certainty that a gesture was correctly detected (not depicted). This percentage may, in one embodiment, be displayed at a location near or adjacent to the indication of the gesture detected 210).

In some embodiments, instead of displaying the visual feedback in a location adjacent to the password input field 208, the visual feedback may be displayed within the password input field 208 itself.

Figure 3:
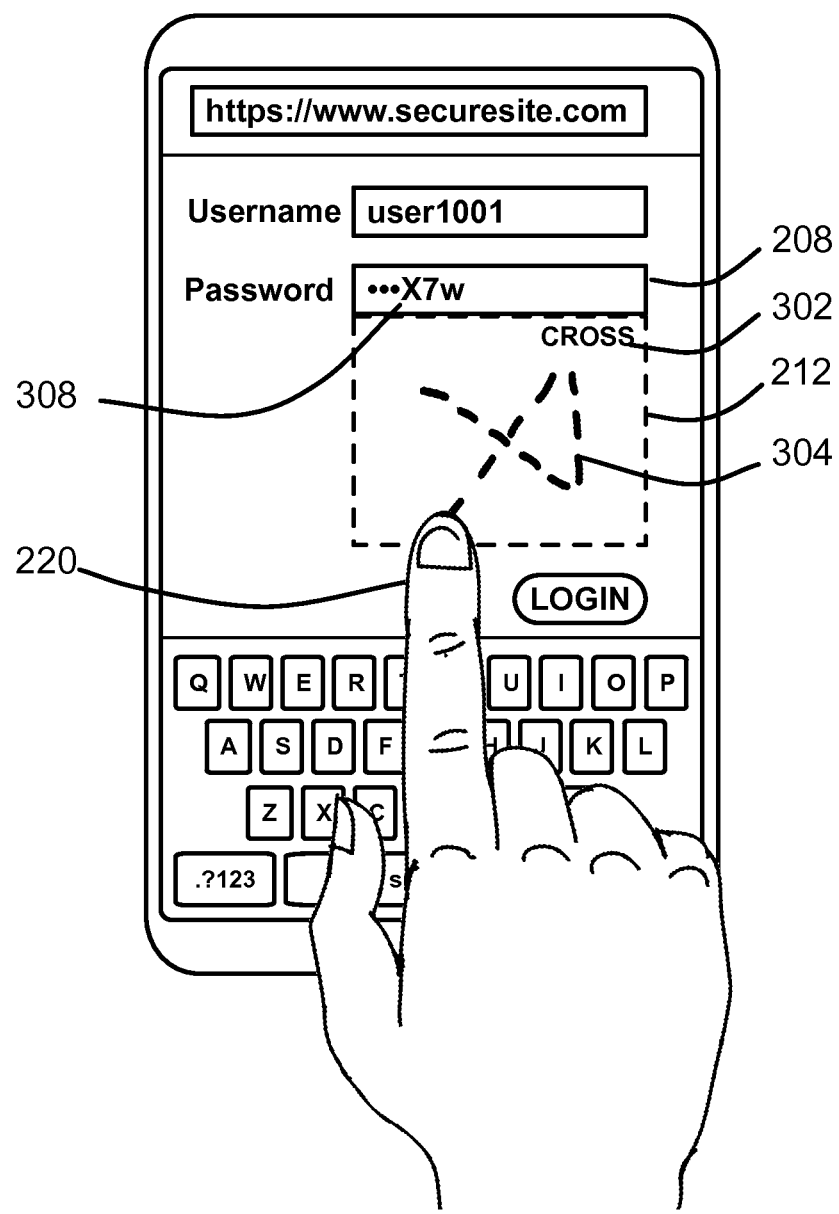
FIG. 3 shows a subsequent state of the system in the use case of a user performing password input via gestures on a mobile device.

FIG. 3 shows a subsequent state of the system in the use case of a user performing password input via gestures on a mobile device. The user's finger 220, (or other pointing object, such as a stylus) has traced a different gesture in the gesture input area 212. This gesture, depicted by dotted lines 304 is now the shape of a cross. The corresponding indication of the detected gesture is displayed, as in FIG. 2, in a location 302 within the gesture input area. The password input field 208 has now been updated to depict the new value of the constructed password after the text manipulation action associated with this gesture has been applied to the value of password input field 208. In this case, the text manipulation action may be appending the letters "X7w". Note that the previous contents of the password input field 208, which were visible in FIG. 2, are now obfuscated.

Figure 4:
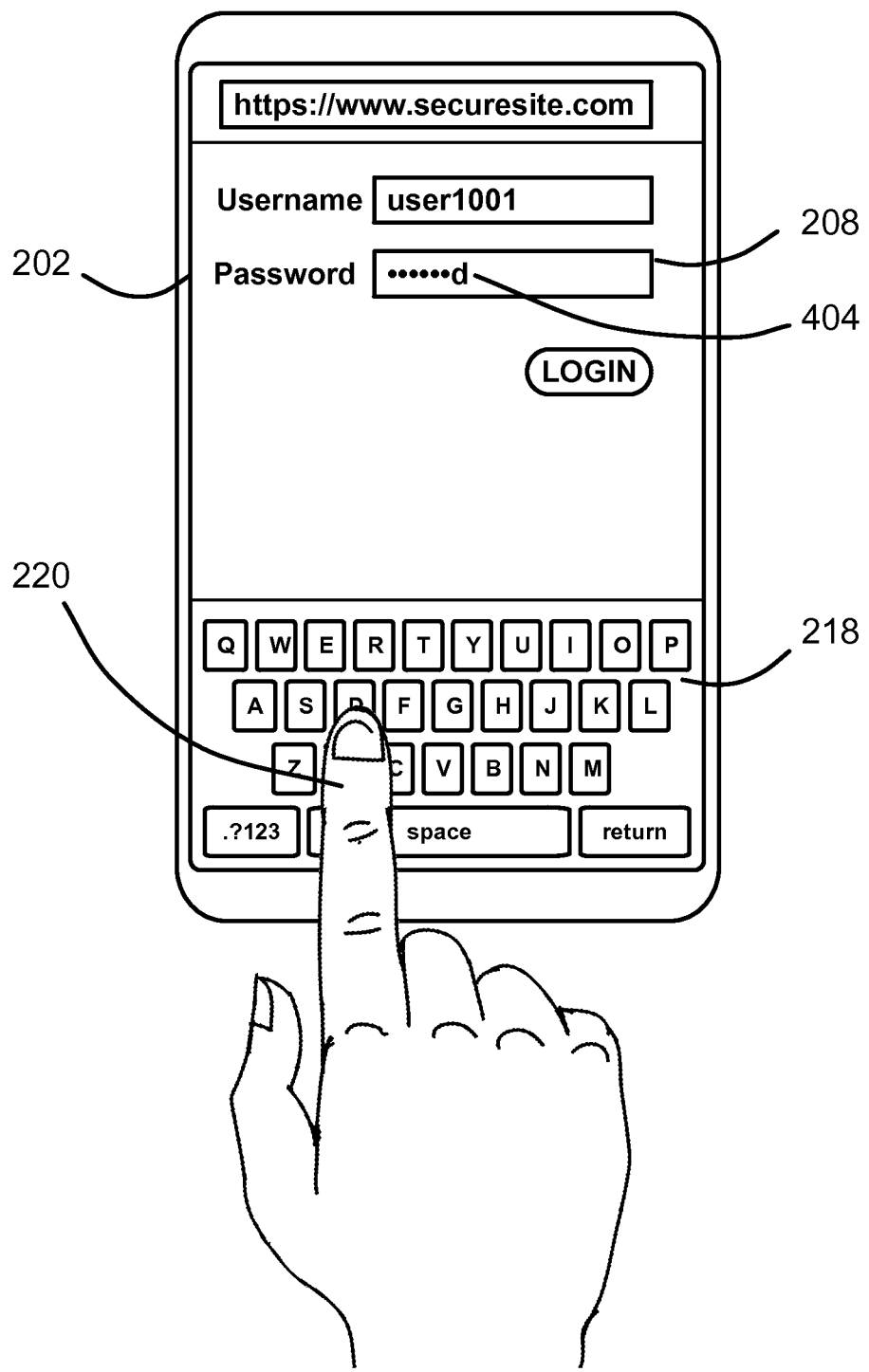
FIG. 4 shows a further subsequent state of the system in the use case of a user performing password input via gestures on a mobile device.

FIG. 4 shows a further subsequent state of the system in the use case of a user performing password input via gestures on a mobile device. The user is now performing conventional text input via the virtual or "soft" keyboard 218 displayed on the GUI 202, and hence the user's finger 220, is currently touching the "d" key in the virtual keyboard area 218. Correspondingly, the contents of the password input field 208 have been updated to depict the character "d" appended to its previous contents, which are now obfuscated.

Simultaneous Gesture/Discrete Input

Gestures may be used in conjunction with, rather than instead of, normal keyboard input. Hence password construction may be through a combination of gestures as well as discrete inputs. Note that the normal keyboard input may also be via touch inputs in the case where the keyboard is a virtual keyboard. The term discrete inputs is used because keyboard inputs comprise one or more separate inputs to select individual keys on the keyboard, which may be virtual or physical, whereas gestures typically comprise one or more continuous inputs via the touchscreen, accelerometer or other physical input sensors. However the term is not limited thereto, and may include other discrete inputs such as selection or activation of other GUI elements such as buttons, icons and the like that may provide further user input. Furthermore, gestures may actually be performed using the keyboard itself rather than a separate gesture input area. That is, the gesture input can be made in the same touchscreen area that conventional keyboard input takes place. Hence a gesture/discrete input differentiator may be needed. The detailed embodiment of such a method is disclosed in a subsequent section.

Figure 5:
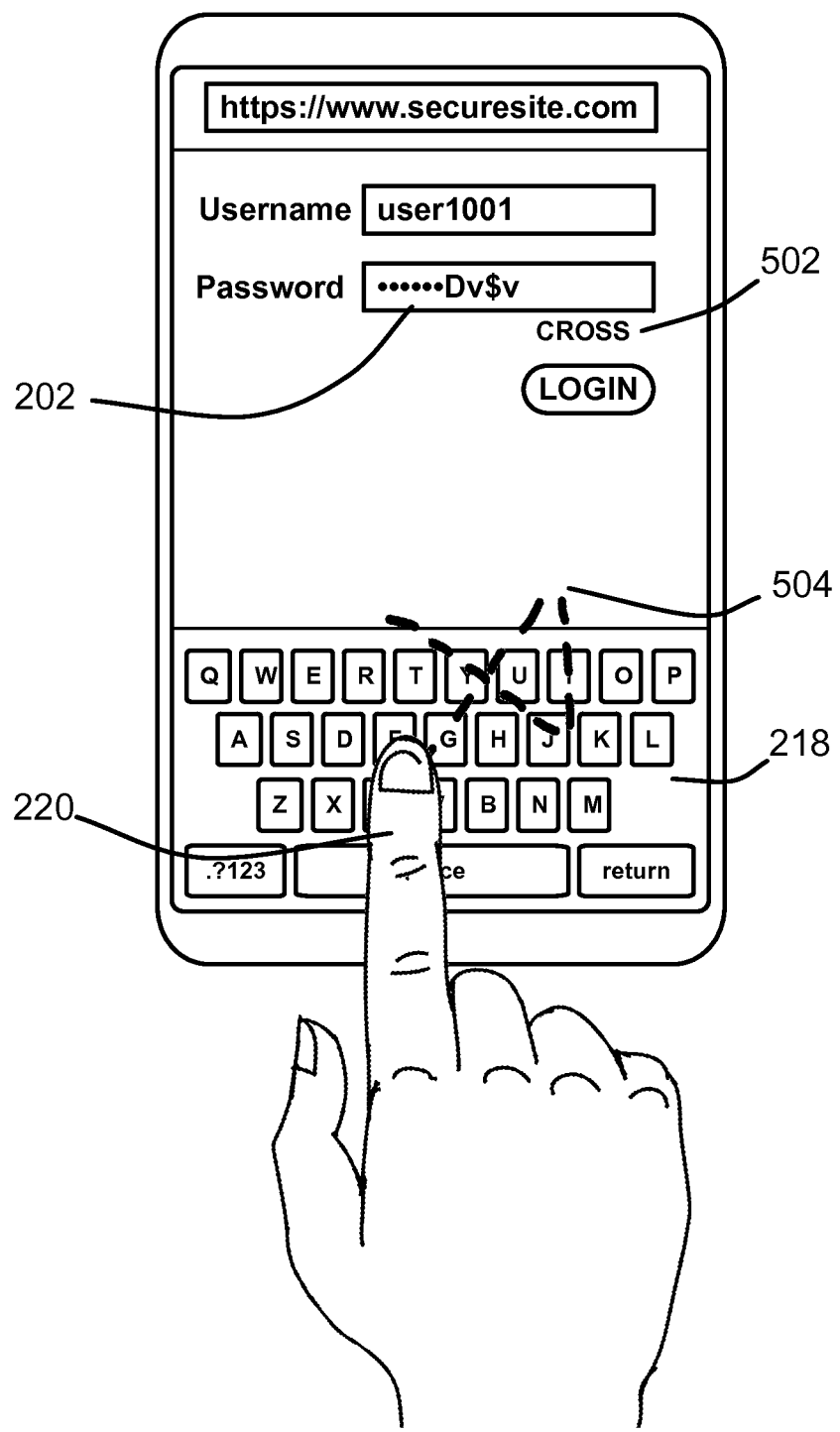
FIG. 5 depicts an alternate embodiment of the system in the use case of a user performing password input via gestures on a mobile device.

FIG. 5 depicts an alternate embodiment of the system in the use case of a user performing password input via gestures on a mobile device. In this embodiment, there may not be a separate gesture input area, as there was a separate gesture input area 212 in FIGS. 2 and 3. Instead, the user's finger 220 has performed a "cross" gesture 504 depicted by dotted lines in an area on the touchscreen GUI that includes the virtual keyboard 218. Yet the system has detected the gesture, and presented an indication of the detected gesture 502 at a location adjacent to the password input field 202, which has also been updated to display the effects of the corresponding text manipulation action, which, in this case, is changing the case of the last letter "d" of the password input field 220 from lowercase to uppercase, and appending the string "v$v".

Note that this embodiment is not exclusive with the other embodiments, and that gestures may be performed on the virtual keyboard even in the presence of a separate gesture input area 212. The subsequent section will discuss how the system can be enabled to detect gestures performed on a virtual keyboard 218 rather than a separate gesture input area 218.

Similarly for other computer form factors, such as those involving physical keyboards and touchpads or external mouse peripherals, gesture input may be via touchpad or mouse input, whereas conventional text input may be via the physical keyboards.

Figure 6:
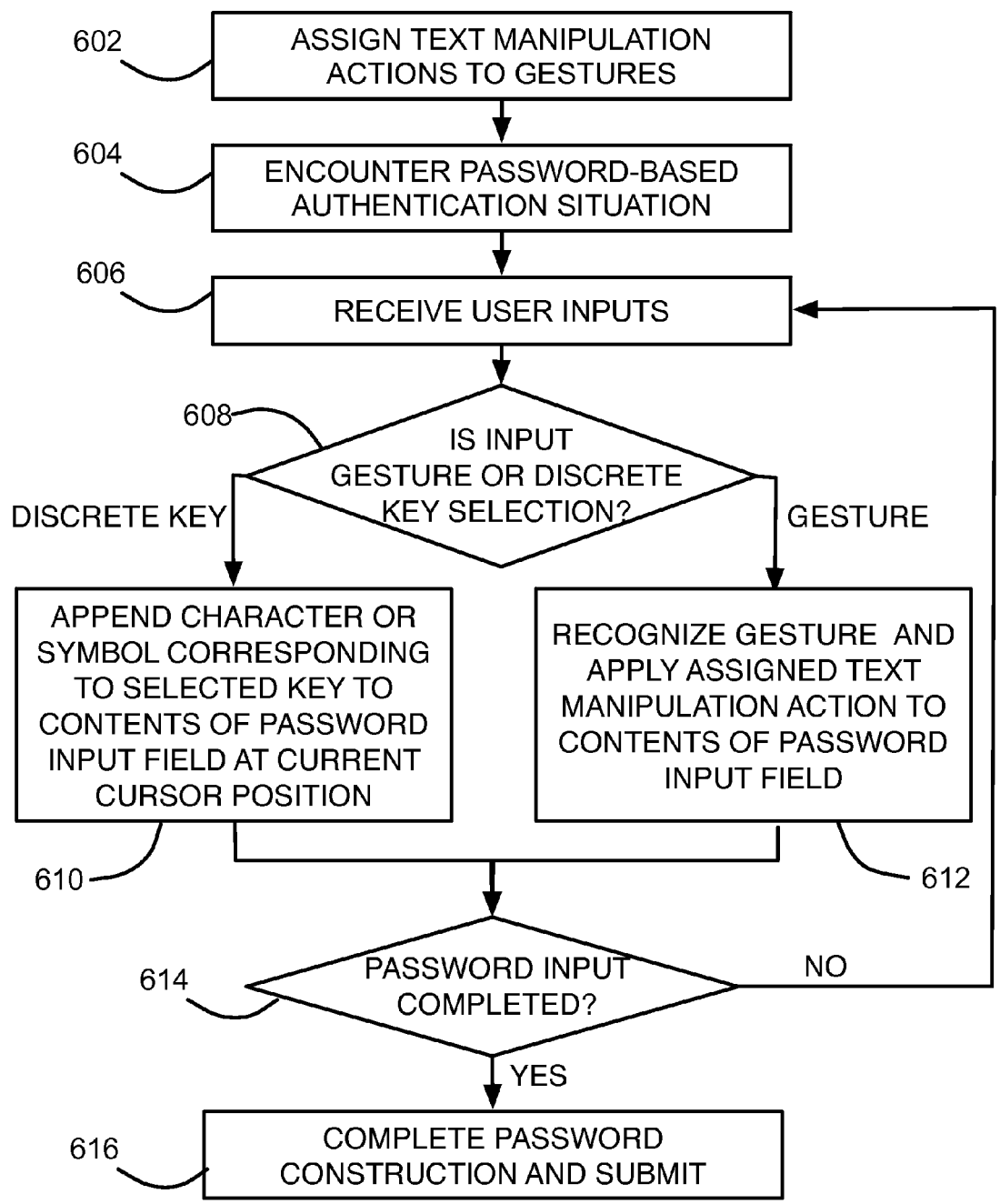
FIG. 6 depicts a flowchart showing the steps required to distinguish between a discrete key input and a gesture input on a virtual keyboard.

FIG. 6 depicts a flowchart that depicts the steps required to distinguish between a discrete key input and a gesture input on a virtual keyboard. As before, the user first assigns text manipulation actions to gestures (step 602). As part of normal usage, the system then detects or is notified that user has encountered a password input field (step 604). The system may then initiate the gesture-to-password translation mode, and begin tracking user inputs from various sources such as touchscreen, accelerometer, mouse, physical keyboard, and the like (step 606).

The system may then process the received user inputs and determine whether the input is a gesture or a discrete key selection (step 608). For instance, the user may touch a specific key on the virtual keyboard or physical keyboard. Alternatively, the user may trace a gesture on the touchscreen in a specific gesture-input area (such as 212 in FIGS. 1-3) or in the virtual keyboard area itself (such as 218 in FIGS. 1 and 5). The system hence determines whether the input was a gesture or a discrete selection and proceeds accordingly.

If the system determines the input was a discrete key selection, it may determine the character or symbol corresponding to the selected key and append the determined character or symbol to the current contents of the password input field, preferably at the current cursor position (step 610). In another embodiment, it may append the determined character or symbol at a constant, pre-configured location irrespective of the current cursor position, either at the beginning or the end of the contents of the password input field.

Alternatively, if the system determines the input was a gesture, it may recognize the gesture, determine the text manipulation action assigned to the recognized gesture, and apply the text manipulation action to the contents of the password input field (step 612).

After performing either discrete key-based password input (step 610) or gesture-based password input (step 612), the system then proceeds to detect whether password input is completed (step 614). This may be done by the user explicitly instructing the system via an input (such as clicking or touching a "submit" button or an "enter" or "return" key, or via pre-configured gesture), or the system detecting by other means such as the length of the constructed password reaching a pre-configured length, or the cryptographic hash of the constructed password matching a pre-configured value. If it is detected that password input is not completed, the system returns to receiving user inputs (step 606). Alternatively, the constructed password and other credentials (such as username) are submitted for authentication (step 616).

Gesture/Discrete Input Differentiation Method

As mentioned previously, some methods may be needed by which the system may distinguish discrete key selection or gestures, especially in the case where gesture input may be performed in the same area of the touchscreen as the virtual keyboard. The system may distinguish between a discrete GUI key selection or a gesture based on the characteristics of the inputs, including the coordinates and length of the stroke. Given a vector or sequence of one or more coordinates representing the input, where the inputs are generated based on touch or motion inputs the user, the following methods may be used:

If the "center" of the coordinates is substantially located within the boundaries or coordinates of a key on the virtual keyboard, the input may be determined to be a gesture. A "center" may be determined, for instance by taking an average of the input vector, or determining the centroid of the polygon defined by the convex hull of the coordinates.

If the input vector represents at least one stroke of some length greater than a threshold, the input may be determined to be a gesture.

If the input vector spans the virtual coordinates comprising two or more keys on the virtual keyboard rather than a single key, the input may be determined to be a gesture.

If the input vector lies substantially outside the boundaries or coordinates of the virtual keyboard, the input may be determined to be a gesture.

If the input vector comprises or can accurately be represented by a single point, and that point lies within the boundaries of the virtual keyboard and/or the boundaries of a key on the virtual keyboard, it may instead be determined to be a discrete key input.

If a user has previously indicated that gesture input is to be expected, either by pressing a discrete key on the virtual keyboard, or pressing a hardware button on the device, or by performing another gesture, the input may be assumed to be a gesture.

If the touchscreen is multi-touch enabled, determining if two or more separate touch inputs were detected may result in determining that one or both of the inputs are gestures.

Thus, since touch inputs performed on the virtual keyboard itself rather than on a separate area of the UI, and may still be distinguished as gesture or discrete key input by the system, this may help minimize the area of the display needed for user input and to maximize the area of the display that may be dedicated to display of the content.

Additionally, if gesture and discrete input may be coincident on the same GUI area on the touchscreen, additional methods may be employed to distinguish further between different gestures. In one embodiment, when a gesture is detected to be performed in or near the virtual keyboard, if the gesture coordinates coincide with the bounds of at least one key on the keyboard, that key may be used to further distinguish between gestures. For instance, a vector of input coordinates describing a specific shape that coincides with the bounds on the letter "Q" on the virtual keyboard may be interpreted as a different gesture than if another vector of input coordinates describing a similar shape coincides with the bounds of the letter "W". Hence a gesture that, for instance, starts at the letter "Q" on the virtual keyboard may result in the application of a different assigned text manipulation action than if the same gesture was performed starting at the letter "W" on the virtual keyboard.

Contextual Mapping Selection

Different gesture-password fragment mappings (or associations) may be assigned by the user, and the user may create rules configuring which associations are used given certain contextual criteria and conditions, such that and different associations may be used at different contexts, based on the configured criteria and conditions. Conditions and criteria for identifying a context that determines which mapping to use may comprise, for example:

- The website, URL, application or document the user is entering the password to authenticate with;
- The user's location or device location, as determined by a GPS coupled to the device;
- The time of day;
- An identifier of the user performing the authentication, such as the username being used for authentication.

The username being used for authentication may be detected by, for example:

- Determining a username text input field in visual proximity or in structural proximity (as in a DOM tree) of a password input field; or
- Determining a currently logged in user from a current session; or
- Determining the user via other inputs, such as biometric inputs, or facial recognition or voice recognition, etc.

This is required for, as an example, enabling multiple different users to use the system on the same device, wherein the users may be identified, for example, by an entered or selected username.

Determining a username input field in proximity of the password input field may use visual or structural cues. In visual methods, the display coordinates of the password input field and other textual input fields are determined (either accurately or at an estimate), and the relevant username field is determined as the text input field having the shortest Euclidean distance to the password input field based on these coordinates. This method relies on the assumption that username and password input fields are typically placed close to each other.

Alternatively, in a hierarchically structure document, such as a DOM tree in a webpage document, tree-traversal methods may be used, such as inverse tree traversal (i.e. from a leaf or intermediate node to the root), breadth-first traversal (BFS), and/or depth-first traversal (DFS).

In one example for a web-based login page, a password input field maybe detected by retrieving all elements with the type "password". Then, the following elements are inspected to check if they are text input fields, keeping track of elements inspected so as not to inspect them again:

- Sibling elements of the password element
- Elements encountered when a BFS is performed on the node of the password element;
- Elements encountered when a BFS is performed on the parent node of the password element;
- Elements encountered when a BFS is performed recursively on ancestors of the password element, potentially within a given threshold height difference.

The first text field so encountered, potentially in addition to meeting certain other criteria, is assumed to be the username field Thus a leaf-to-root reverse BFS starting at the password element DOM node is performed on the assumption that username and password input fields would be located in proximity in the DOM tree structure.

Other methods and criteria used may involve inspecting the text content of the labels in visual or structural proximity of detected text input fields, e.g. by checking for words like "User", "Username", "Login", "Password", or their foreign language counterparts, and the like.

Decoy Gestures

Decoy gestures may be used to obfuscate input from nearby people. For example, certain gestures may be mapped to empty password manipulation actions that cause no change in the constructed password value. Alternatively, two or more gestures can be assigned fragments and "actions" that cancel each other out. For example, one gesture may cause a given password fragment to be appended to the constructed password value, and a subsequent gesture may cause that password fragment to be removed from the constructed password value.

In one embodiment, gestures may cause changes in both, the password input field and a constructed password field in memory, but decoy gestures may apply only to the password input field, so as to lend a visual illusion that the gesture has some effect. However, the actual password value of record may be maintained in the constructed password field in memory, and decoy gestures may not be applied to it, and when the password gets submitted, it would be the value of this constructed password field in memory that gets submitted rather than the incorrect value of the password input field.

Remote Gesture-to-Password Translation

Figure 7:
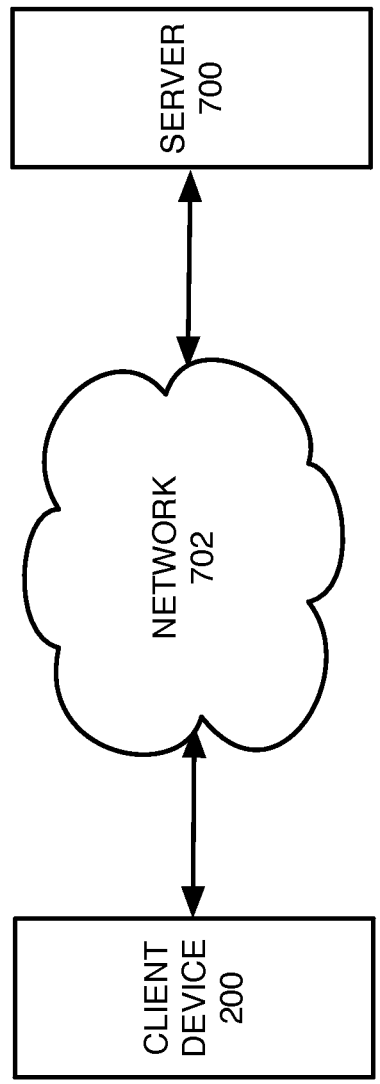
FIG. 7 shows a high level diagram of a client/server embodiment of the invention.

In one embodiment, a client-server system may be used to implement the gesture-to-translation method and system. In this embodiment, the different steps involved in detection of a gesture and the mapping of the gesture to a password input or text manipulation command and the subsequent evaluation of said password input or text manipulation command may be performed on different machines, such as a client and a server, which communicate with each via means of a network, such as the Internet. FIG. 7 shows a block diagram of such an embodiment. A client device 200 is connected to a server computer 700 via a wide area network 702, such as the Internet.

Figure 8A:
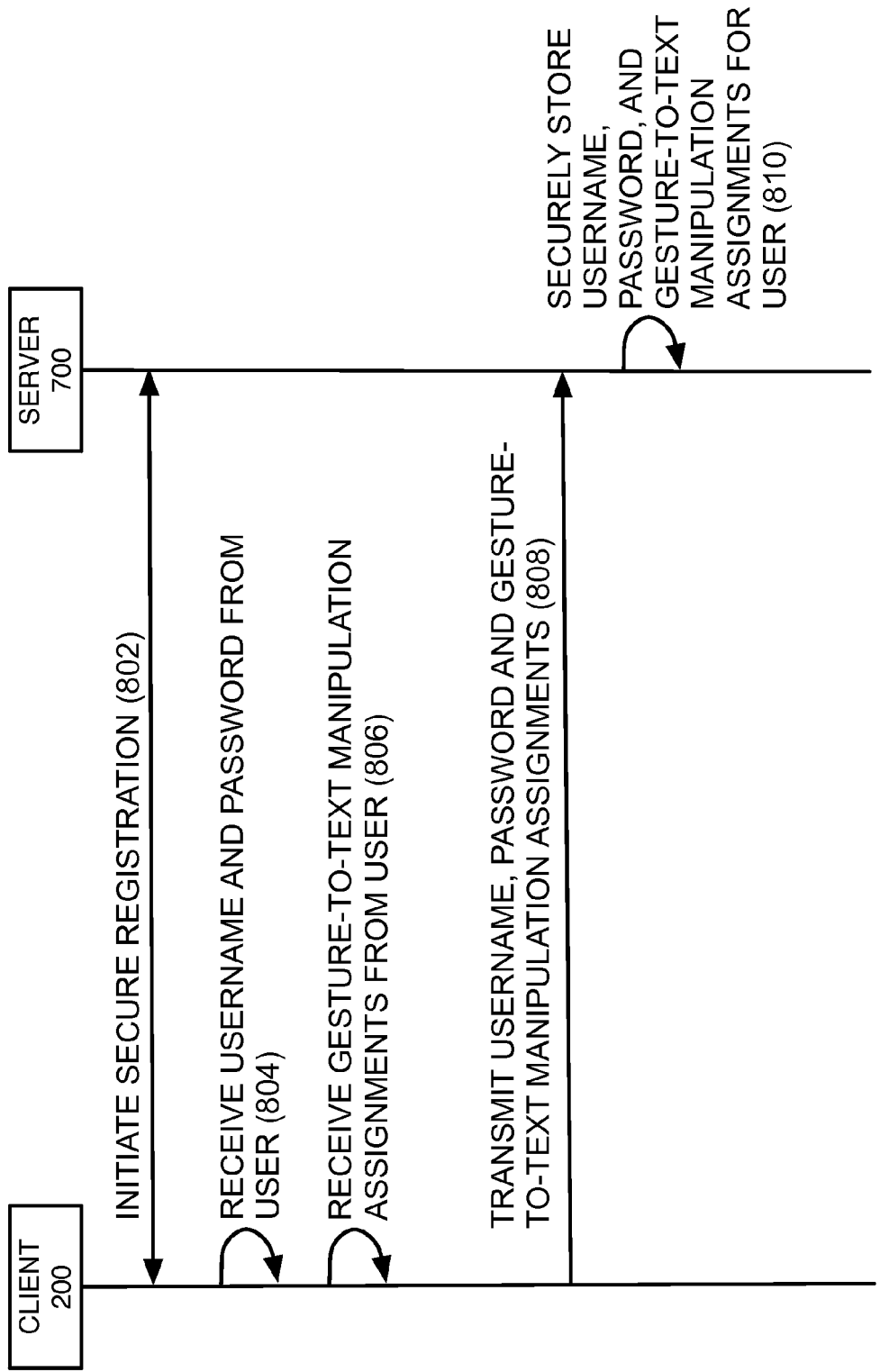
FIGS. 8A, 8B and 8C depict a communication flow-graph illustrating the procedures involved in a client/server embodiment of the invention.
Figure 8B:
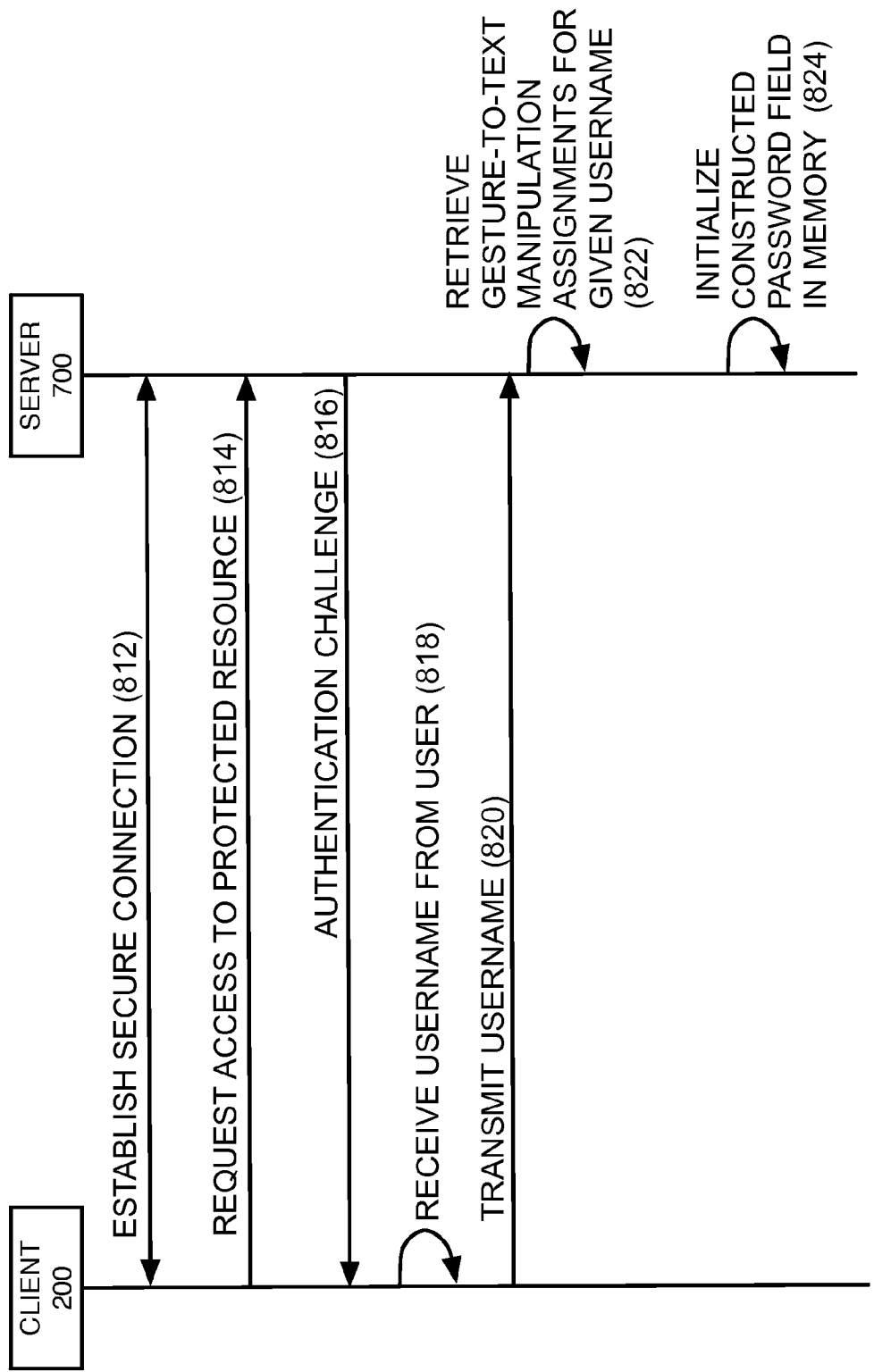
Figure 8C:
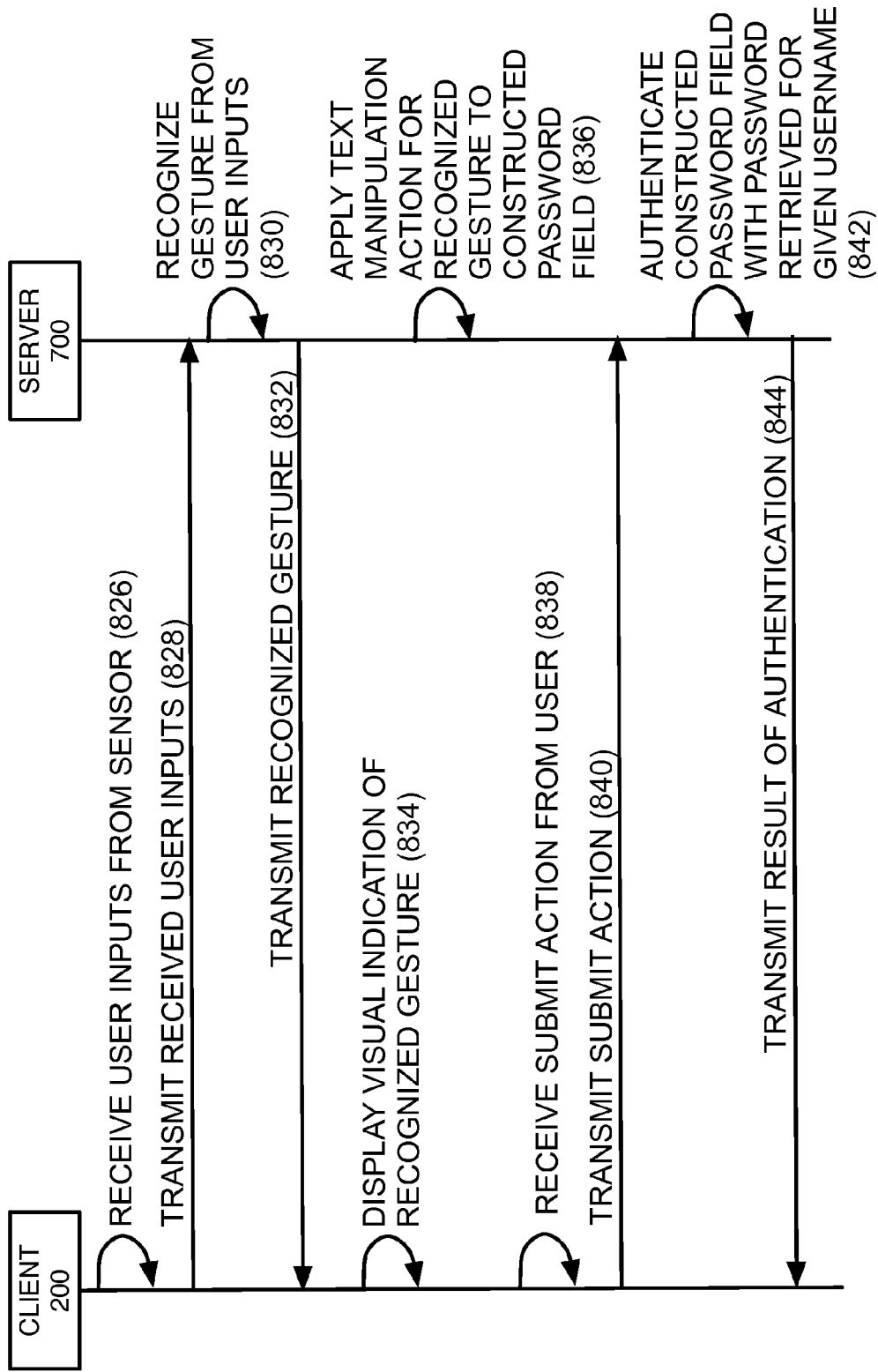

FIGS. 8A, 8B and 8C depict the steps required in an exemplary implementation of this embodiment, and the interactions between client and server. In this embodiment, a client device 200 may connect to a server device 700. The server device 700, as in previous embodiments, may host the protected resource that the user desires to access, and which is protected by a password. The mapping of gestures to text manipulation actions such as appending password fragments may be, as in previous embodiments, pre-configured by the user, only in this embodiment the gesture-to-password input mapping is stored securely on the server device and not the client device. The following section describes the implementation in more detail. Note that some steps may be interchanged in order or may be optionally skipped for the purposes of implementation simplicity or improved user experience.

Hence the client device 200, on behalf of the user, may first securely connect to the server computer 700 and initiate a registration process (step 702). This may be done, for example, by requesting a registration webpage from the server 700 over a secure (HTTPS) connection, where the webpage comprises a registration form that includes various fields the user must provide to the server for the purposes of registration, such as name, user ID, password and the like. The client device 200 may receive the username and password from the user (step 804). The client device 200 may also receive the gesture-to-text manipulation actions assignment from the user (step 806). On receiving the necessary information to complete registration or potentially simply to enable gesture-to-password translation, the client device 200 may transmit the information to the server 700, including the username, password and gesture-to-text manipulation assignments (step 808). Note that the client 200 may submit all the information at once, or each item of information or credential one at a time as it is entered. For instance, if a web application is being used, AJAX (Asynchronous JavaScript and XML) calls may be made to transmit information in the background.

The server 700, on receiving the username, password and gesture-to-text manipulation action assignment information from the client 200, may then securely store the information for authenticating the client (or the user thereof) in the future (step 810). This may involve, for example, generating a cryptographic hash of the password and storing that. Similarly, this may also involve generating decoy gesture-to-text manipulation action assignments to obfuscate the user's selected gestures.

Note that while in this embodiment the username, password and gesture-to-text manipulation action assignments are provided by the user in the same session, this may not necessarily be the case in other embodiment. For instance, the user may elect to provide only basic credentials such as username and password during an initial registration, and may provide the gesture-to-text manipulation action assignment information during a separate session at some later point in time subsequently.

At some point subsequently, the user may then desire to access a protected resource (such as a user account or other webpage with restricted access) hosted on the server 700. This may involve first establishing a secure connection, such as via SSL or HTTPS (step 812). On attempting to access the protected resource, or a resource that is a gateway to the protected resource (step 814), the user may be presented with an authentication challenge (step 816), for instance containing a username and a password input field on the user interface. The password input field may be presented on the client device as part of a document in a document viewer application, such as through a webpage in a browser. Alternatively, the password input field may simply be a user interface element in a non-browser GUI-enabled application. The password input field and the document containing it may be fetched and displayed from the server device, such as a web server or web application server 700.

In typical password-based authentication flows, the user is prompted to enter a username first. On receiving the username from the user (step 818), the client device 200 may transmit the received username to the server 700 (step 820). This may be done, as before, in the background using methods such as AJAX calls in the case of web applications, or other interprocess communication methods for other types of applications. On receiving the username from the client device 200, the server 700 may then retrieve the gesture-to-text manipulation assignments for the user (step 822). The server 700 may also initialize a constructed password field in memory (step 824).

The client device 200 may then receive user inputs (step 826), such as via touchscreen inputs, on the password input field or a location adjacent thereto, such as on a portion of the document containing the password input field, using user interface elements as described previously. On detecting a user input, however, the client device 200 may not attempt to recognize the gesture and map it to a password input or text manipulation command, as in previously discussed embodiments. Instead, the client device 200 may transmit the received user inputs to the server 700 (step 828). In an embodiment, the client device may transmit the coordinates or vector of the received user inputs of the gesture themselves to the server. The client device 200 may either transmit the received user inputs to the server 700 as soon as they are received, or may buffer them to reduce the number of network messages, or may transmit the user inputs only after detecting that a gesture has been completed, for instance by detecting the completion of stroke on the touchscreen. Note that the client device 200 may perform some basic detection, and if the user input is determined to be conventional keyboard-based input, the text corresponding to that keyboard-based input may instead be transmitted to the server computer 700. In alternate embodiments, the client device 200 itself may perform gesture recognition and transmit the recognized gesture to the server 700.

The server 700 may then evaluate the received user inputs and recognize a gesture, if any (step 830). The server 700 may transmit the recognized gesture back to the client device 200 (step 832), which may then use that information to provide a visual indication of the recognized gesture to the user (step 834) as a form of visual feedback, or a confirmation that the user input was received and evaluated by the server 700.

In an embodiment, for each detected and recognized gesture input, the server may return to the client device information about the recognized gesture, or the text manipulation action it maps to, or the current value of the constructed password field, or any combination thereof. This information may include:

Whether a gesture was successfully detected;

The name or type of gesture detected;

The number of symbols, characters or other components of the password fragment string associated with the password input command the detected gesture maps to.

The symbols, characters or other components of the password fragment string resulting from application of the text manipulation action that the detected gesture maps to; Note that this may be a less preferred embodiment as the text manipulation action or resulting constructed password may be more vulnerable as it is now also stored at a client device, which may be more likely to be compromised.

The client device may use this information to provide visual feedback to the user, such as by one or more of the following:

Displaying the detected gesture name at a location on the user interface on or near the password input field, so that the user can determine whether he or she had indeed input the correct gesture, or that the gesture has been detected correctly at the server device;

Populating (or in the case of subsequent gestures, appending to) the password input field with a string containing a number of asterisks ("*") or other symbol used to conceal the password text, the number of asterisks corresponding to the number of characters of the password fragment string associated via the password input command that the detected gesture maps to, providing further visual feedback that the user can use to determine that the evaluated password string is indeed correct;

Populating (or in the case of subsequent gestures, appending to) the password input field with the actual characters of the password fragment string associated via the password input command that the detected gesture maps to, providing further visual feedback that the user can use to determine that the evaluated password string is indeed correct. Note that the password input field may automatically hide these characters with a concealing symbol as typical password input user interface elements typically do. Note also that the input field may briefly display the actual password string momentarily for further visual feedback before replacing it with the concealing symbols.

In an alternate embodiment, the server 700 may transmit the actual password fragments or other text manipulation actions back to the client device 200. The client device 200 itself may then construct the complete password string by appending the strings or applying the text manipulation actions returned by the server for each remotely detected gesture input. The client 200 may then transmit the constructed password to the server 700 along with an indication that the password is completely constructed. In one embodiment, the server 700 may detect that a password is completely constructed by receiving a command from the user via the client device.

Meanwhile, the server 700 may (typically, concurrently with steps 832 and 834) use the recognized gesture in conjunction with the gesture-to-text manipulation assignments retrieved in step 822 to determine an assigned text manipulation action. The server 700 may then apply the determined text manipulation action to the constructed password field in memory (step 836). The text manipulation action, such as appending of a password fragment, that the gesture maps to may be determined by looking up the recognized gesture in an associative data structure containing the pre-configured gesture-to-password input mapping.

Steps 826 through 836 may be performed iteratively a number of times, for instance, for each user input provided by the user at the client device 200. Each successive text manipulation action for a recognized gesture may be applied to the constructed password field in memory. For instance, if all configured text manipulation actions comprise appending of a password fragment, for subsequent evaluated gestures, updating the constructed password field in memory may include appending the password fragment string created by the password input to the password fragment strings created by evaluating the password inputs mapped by previous gestures.

Thus, by evaluating a sequence of one or more gestures transmitted by the client device 200 based on user input, the server 700 may construct a password string in the constructed password field in its memory.

The server 700 may then detect that the password is completely constructed. In one embodiment, the server may detect that a password is completely constructed by receiving a command from the user via the client device 200 (step 838). Such a command may be initiated by the pressing of a button on the UI, such as a "Login" or "Submit" button; or the pressing of a key on a keyboard (either physical or virtual) such as the "Enter" or "Return" key; or via another gesture which may be pre-configured by the user, the server device, the application on the client device 200, or any combination thereof, such as by double-tapping the password input field. The client device 200 may transmit this command to the server 700 (step 840). In alternate embodiments, the server 700 may detect completion of password construction automatically by other means, as discussed in previous sections.

On detecting that the completely constructed password has been received, the server 700 may then authenticate the user using the submitted username and the constructed password field as the credentials (step 842) by comparing against the password associated with the username that has been securely stored during registration. The server 700 may evaluate the constructed password field as it may evaluate any other password entered by conventional means. This may involve, as described in previous sections, cryptographic methods such as salting and hashing the password string, or using cryptographic methods such as bcrypt (described in the paper by Provos et al, "A Future-Adaptable Password Scheme". Proceedings of 1999 USENIX Annual Technical Conference) or scrypt described in IETF RFC 7914), and comparing with the similarly treated password data stored in a user password database, and on the basis of this comparison, either allow or deny the user of the client device access to the protected resource.

The server 700 may then transmit the results of the authentication to the client device 200, either granting or denying access to the protected resource (step 844).

In this manner, the client device 200 need not store either the gestures or the password inputs. Since the gesture-to-text manipulation assignment need not be available on the client device, increased security is achieved, as it would make it difficult to brute-force the password from a limited set of gestures even if physical access to the device has been gained. As the text manipulation actions and any password fragments assigned to the gestures are only ever maintained at the server and would be completely unknown to an attacker, the attacker may be unable to derive a password even with complete access to a client device 200. Additionally, as a user may define arbitrary gestures that may be completely unknown to an attacker, and these gestures themselves may be stored only on the server 700 and not the client device 200, the attacker may be further disadvantaged.

Security Considerations

This method may be seen as a trade-off between security and convenience. By reducing the number of inputs from a larger number of characters to a smaller number of gestures, an attacker may find it easier to brute force a password using fewer combinations and permutations. On the other hand, it may be argued that by enabling quick input of passwords via gestures, security may be enhanced by affording attackers less opportunity to discretely observe a user inputting the textual password on a virtual keyboard, which is typically a laborious and slow process.

However, the fact remains that the more gestures the user assigns to (and correspondingly, the number of fragments created of) a password, the greater the number of combinations and permutations for an attacker to attempt, and hence greater would be the security afforded.

However, as the number of gestures would typically be smaller than the number of symbols in a password, the security provided is weaker. However, since gesture input is much easier than textual input on modern devices, such as via touch and/or movement inputs, long text-based passwords, such as those ideal for logging into websites, banks, email accounts and the like, may be more easily entered by the user on such devices. As mentioned before, this method may essentially be a compromise trading off decreased security for increased convenience.

If there are N possible gestures and the user selects M different gestures, each and assigned to one of M different password fragments (or password manipulation actions, described below), the entropy provided is N^M, as there are N^M different ways to select those gestures. For instance, if a system has 25 possible gestures and the user selects 3 of them, an uninformed attacker may have to try 25^3=15625 different combinations to guess the password.

However, if the attacker can gain access to the password fragments assigned to each gesture, (since, in the current embodiment, they would have to be stored in memory somewhere to resolve the gesture to a fragment at time of input) an attacker may be able to make more informed guess based on the values of the fragments. For instance, fragments that are part of frequently used passwords, (such as a sequence of fragments that looks like "pas", "wo", "rd"), or easily discoverable user-specific information (such as favorite pet's name) may enable an attacker to rapidly narrow down the most likely candidates. This weakness may be addressed in an alternate embodiment, discussed in a subsequent section, whereby the password fragments are not stored on the user device and instead at a remote server where a protected resource being accessed by the user is hosted.

For this reason, it may be desirable to restrict access to the configuration data that holds the gesture-fragment mappings, such as by restricting access only to users that authenticate through other means, such as another password input, or biometric access methods, and/or encrypting the configuration data when it's not being actively accessed. One alternate approach may be to restrict gesture-based password input only to users who can be verified to be the person associated with a given username or account by, for instance, biometric methods such as fingerprint scanning, since many modern smartphone devices come equipped with fingerprint scanners. Additional means of verifying users may include methods such as facial recognition, voice recognition, iris recognition and the like. Alternatively, each gesture itself may act as a biometric signature. For instance, there has been a lot of recent research whereby characteristics of the gesture input itself, such as the speed, timing and shape of the gestures can be used to uniquely and accurately identify users. See for instance the following references:

Various entries at "I Am How I Touch: Authenticating Users", session at CHI 2012

"iSignOn, information for which can be found by searching on Google

Muhammad Shahzad, Alex X. Liu, Arjmand Samuel, "Secure Unlocking of Mobile Touch Screen Devices by Simple Gestures—You can see it but you cannot do it", in Mobicom 2013

In yet another alternative, only devices that have been previously authorized by the user, and which can be identified as such (for example, by use of means such as cookies), may be provided with an option to sign in using gestures. Users who cannot be verified by such alternate methods may then be forced to enter the password via traditional methods.

On the other hand, security may be enhanced in a compromised environment, for instance, when operating in the threat of presence of surveillance or malware methods such as key-loggers. Since majority of the password input would in the form of gestures (e.g. via touch, stylus, movement or mouse input) rather than keystrokes, the semantics and associations of which are not readily available to the key-logger, a user may be able to securely log in to a service without exposing the password. An attacker would require much more sophisticated methods, such as inspecting a number of memory locations in virtual memory, to identify potential gesture-fragment mappings in order to make sense of the gesture inputs received, if any.

In another embodiment, this method may be used in conjunction, with e.g. password manager applications. A good overview of password managers is available at the Wikipedia entry for Password Managers.

Furthermore, to prevent brute force attacks, the system may be configured to allow only a limited number of incorrect gesture-based password input attempts. Once this limit is crossed, the system may allow only conventional text-based password input, or may enforce a delay before allowing another attempt, or may employ a combination of these approaches.

Exemplary Use Case

The following paragraphs describe an example usage scenario of the present invention.

A user Bob may wish to log into his email account at example.com. Bob may have a username bob@example.com and a textual password "pAs5w0rd" as his credentials for authenticating with that email service provider. To make password entry easier on his touchscreen-based smartphone, Bob may wish to use the gesture-based password input method.

Hence, Bob may initialize a system that facilitates gesture-based password entry. Bob may configure the system to assign various gestures to various fragments of his password as follows. Bob may first split his password into three text fragments, for example, "pAs", "5w" and "0rd". He may then assign a different gesture to each fragment. Via a user interface presented by the system, he may assign a "circle" shape to the first text fragment "pAs", a "cross" shape to the second text fragment "5w" and a "check-mark" shape to the third text fragment "0rd".

The system may then store the mapping, or the association, of gestures to text fragments configured by Bob in a secure manner. The system may generate a number of random mappings as decoys, such as mapping a "star" shape to a fourth text fragment "Kr3d", a "squiggly-line" shape to a fifth text fragment "enT", a "square" shape to a sixth text fragment "!alz", and so on.

The next time Bob attempts to log in to the example.com email website, the system may detect the presence of the password input field and initiate a gesture-detection mode. The system may note that the URL of the current website is "example.com", and the value in the "username" field on the login page is "bob@example.com", and may thus identify which gesture-to-text fragment mapping to use. The system may then indicate the availability of gesture input by presenting a "gesture" field adjacent to the password field. Alternatively, the system may detect gestures made by Bob on the virtual keyboard that may be presented for text input.

Bob may then trace a circle on the touchscreen of his device with his finger or a stylus. The system may detect the gesture and identify it to be a circle. The system may then lookup the detected gesture against the gesture-to-text-fragment mapping to identify the fragment associated with this gesture, and thus may retrieve the text fragment, "pAs". The system may then append this fragment to the current value in the password input field, which is initially empty and after appending become "pAs". The system may flash the word "CIRCLE" on the User Interface at a location adjacent to the password input field as visual feedback to Bob confirming which gesture was detected. This Bob may detect if a gesture was incorrectly detected, and may undo or delete the previous action, either with another gesture or by using the "backspace" key on the virtual keyboard.

Bob may then trace a cross shape on the touchscreen of his device. The system may detect the gesture as a cross, retrieve the appropriate fragment, "5w", by looking up the detected gesture in the gesture-to-text fragment mapping, and may then append it to the current value "pAs" in the password input field, which may then become "pAs5w". The system may flash the word "CROSS" on the User Interface at a location adjacent to the password input field as visual feedback confirming which gesture was detected.

Bob may then plot a check-mark shape on the touchscreen of his device. The system may detects the check-mark gesture, retrieve the appropriate fragment, "0rd", by looking up the detected gesture in the gesture-to-text fragment mapping, and may then append it to the current value "pAs5w" in the password input field, which then become "pAs5w0rd". The system may flash the word "CHECK" on the User Interface at a location adjacent to the password input field as visual feedback confirming which gesture was detected.

Bob touches the "submit" button, which causes the password value thus constructed to be submitted to the website for authentication. Since the constructed password value "pAs5w0rd" matches Bob's actual password, Bob is allowed to log in.

The present disclosure is described with specificity to meet statutory requirements. However, the description itself is not intended to limit the scope of this patent. Rather, the inventor has contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

The various techniques described herein may be implemented with hardware or software or, where appropriate, with a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the presently disclosed invention. In the case of program code execution on programmable computers, the computer will generally include a processor, a storage medium readable by the processor (including volatile and non-volatile memory and/or storage elements), at least one input device and at least one output device. One or more programs are preferably implemented in a high level procedural, functional or object oriented programming language to communicate with a computer system. However, the program(s) can be implemented in assembly or machine language, if desired. In any case, the language may be a compiled or interpreted language, and combined with hardware implementations.

The described methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the presently disclosed invention. When implemented on a general-purpose processor, the program code combines with the processor to provide a unique apparatus that operates to perform the processing of the presently disclosed invention.

Figure 9:
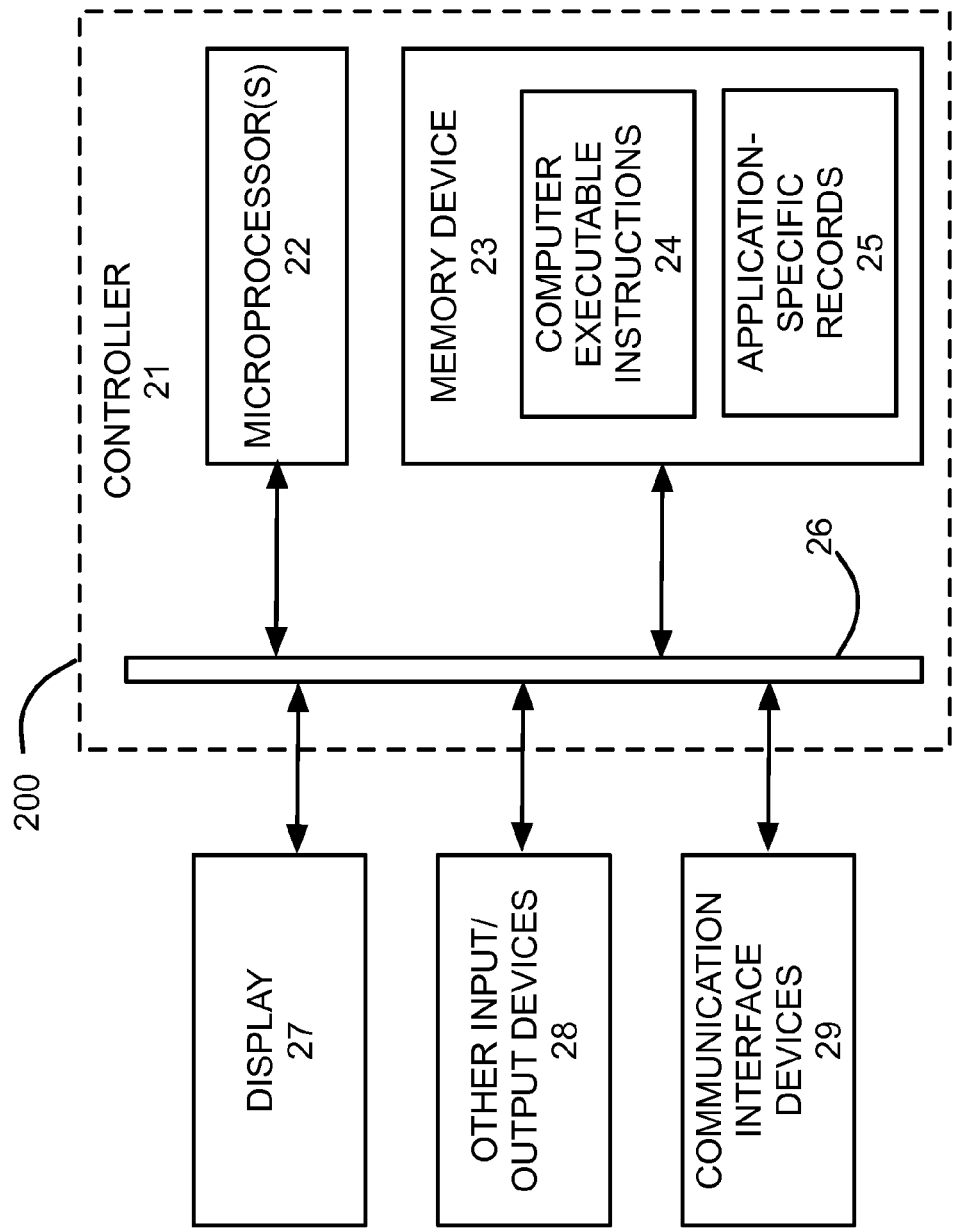
FIG. 9 illustrates one embodiment of a client device depicted in FIGS. 2-5.

Referring now to FIG. 9, FIG. 9 illustrates one embodiment of the client device 200. The device 200 includes a controller 21, a communication interface device 29, a display 27, and other user input and output devices 28. The communication interface device 29 is operable to communicatively couple the device 200 to a wide area network or a wireless local area network or any other types of networks that constitute a distributed network such as network 702 in FIG. 7. As discussed previously, the wide area network may include various different types of mobile communications networks, packet-switched networks, and circuit switched networks. The wireless local area network may include various different types of wireless local area networking links. The communication interface device 29 is adapted to facilitate communications with one or more communication services via a wide area network and/or a wireless local area network. In this example, the communication interface device 29 may facilitate communications for any number of communication services provided by mobile communications networks, packet-switched networks, circuit switched networks, wireless local area networks and/or the like.

Next, the controller 21 has general purpose computer hardware, in this case one or more microprocessors 22, a non-transitory computer readable medium, such as memory device 23, and a system bus 24. The system bus 24 is operably associated with one or more microprocessors 22 so that microprocessors 22 can exchange information with the communication interface device 29, the display 27, and other user input and output devices 28. Furthermore, the controller 21 may also include other hardware such as, control logic, other processing devices, additional non-transitory computer readable mediums, and the like. The memory device 23 may store computer executable instructions 25 for execution by the microprocessors 22. The computer executable instructions 25 configure the operation of the microprocessors 22 so that the microprocessors 22 implement the software applications and methods for the device 200 discussed above. The memory device 23 may also store application specific records 26, such as the associative data structure storing gesture-to-text manipulation assignments. The display 27 may be any suitable display for devices. For example, the display 27 may be a touch screen, a monitor, an LCD display, a plasma display, and/or the like. The other user input and output devices 76 may be an accelerometer, a magnetometer, a gyroscope, a touchpad, another touchscreen, a physical keyboard, a microphone, a headset, a mouse, and/or input buttons, and may depend on the particular configuration of the device 200.

Figure 10:
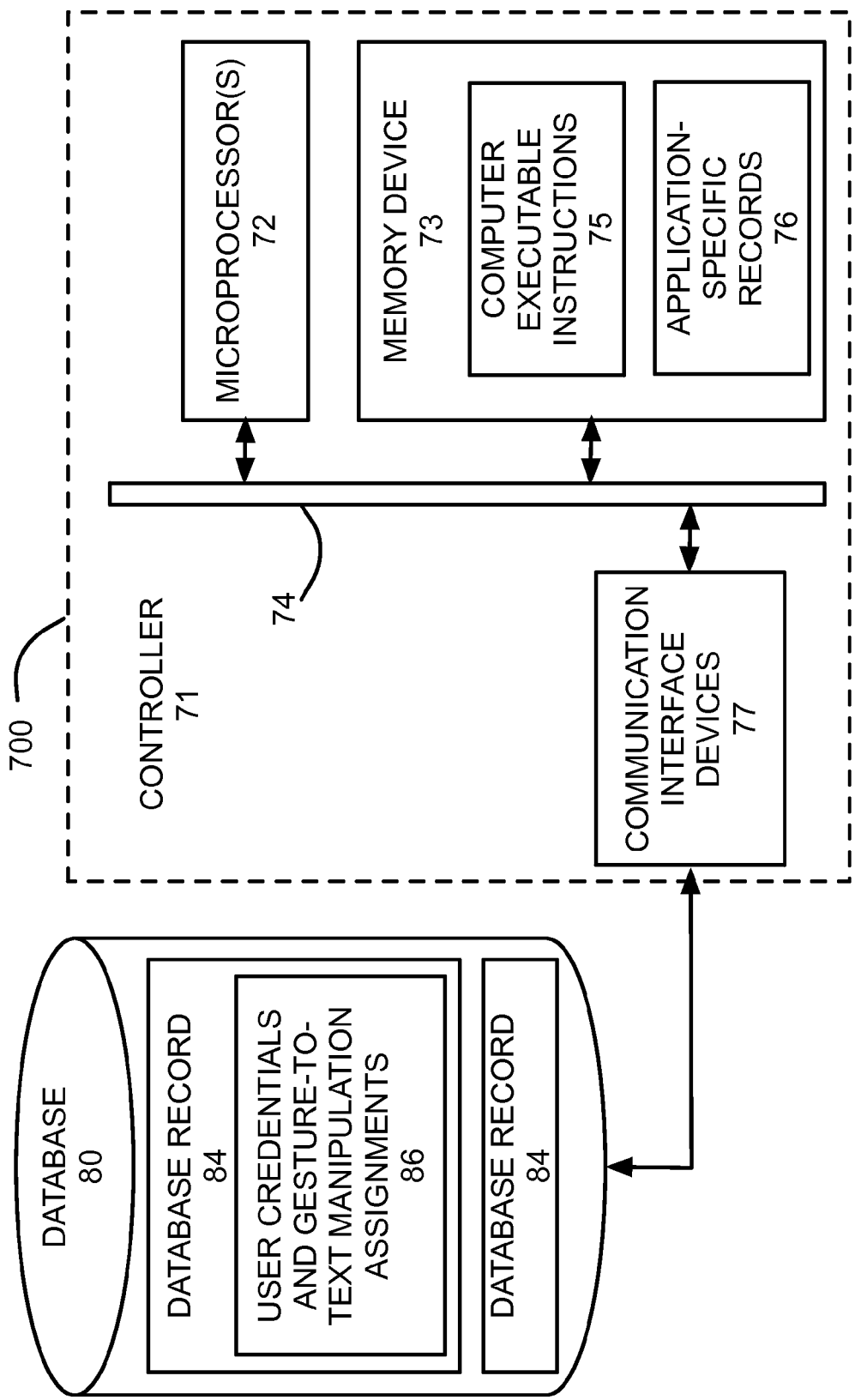
FIG. 10 illustrates one embodiment of a server shown in FIG. 7.

FIG. 10 illustrates one embodiment of the server computer 700 shown in FIG. 7. The server computer 700 includes a controller 71 and a communication interface device 77. The database 80 connects to the server computer 700 through communication interface device 77. The communication interface device 77 also is operable to communicatively couple the server computer 700 to the wide area network 702. As discussed above, wide area network 702 may include various different types of networks. The communication interface device 77 is adapted to facilitate communications with one or more communication services on the wide area network 702. In this example, the communication interface device 77 may facilitate communications for any number of communication services provided by mobile communications networks, packet-switched networks, circuit switched networks, and/or the like. Note that the server computer 700 may be equipped with two or more communication interface devices 77, for example one to communicatively couple the server computer 700 to the public network 702 and one to connect it to the database 80, for example, over a private high-speed LAN.

In this embodiment, the controller 71 has general-purpose computer hardware, in this case one or more microprocessors 72, and a non-transitory computer readable medium, such as a memory device 73, and a system bus 74. The controller 71 may also include other hardware such as, control logic, other processing devices, additional non-transitory computer readable mediums, and the like. User input and output devices (not shown), such as monitors, keyboards, mouse, touch screens, and the like may also be provided to receive input and output information from a server administrator. The memory device 73 may store computer executable instructions 75 for execution by the microprocessors 72. The memory device 73 may also store, typically on a temporary basis, application specific records 75. These application specific records may comprise data necessary for the functioning of the server 700 for performing the steps described previously, such as the data received from a client device 200 such as the username and any received user inputs transmitted by the client 200 to the server 700; the gesture-to-text manipulation actions for the given username; a constructed password field; and the like. The computer executable instructions 75 are executable by the microprocessors 72 and configure the operation of the microprocessors 72 so that the microprocessors 72 implement the software applications for the server computer 700 discussed above. A system bus 74 is operably associated with the microprocessors 72 so that microprocessors 72 can exchange information between the memory device 73, and the communication interface device 77 and other hardware components internal to the server computer 700.

The database 80 may include volatile and persistent database memory that stores the database records 84. Some of these database records 84 may include user-specific data 86, such as the username, securely stored credentials such as a password, and other user-specific data such as the gesture-to-text manipulation assignments configured by a user. The database 80 may also store additional information, such as database tables in local memory. Furthermore, the database 80 may include additional programmed hardware components (not shown) that allow for the creation, organization, retrieval, updating, and/or storage of database records 84.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims. Those skilled in the art will recognize improvements and modifications to the preferred embodiments of the present disclosure. All such improvements and modifications are considered within the scope of the concepts disclosed herein and the claims that follow.

What is claimed is:

1. A computer-implemented method of translating gestures to a password, said password partitioned into a plurality of password fragments, the number of password fragments being lesser than the number of characters in the password, the method comprising:
   at a server, receiving, via a network connection, data representing one or more user inputs comprising sequences of user input coordinates;
   recognizing, at the server, one or more gestures based on the received user inputs;
   determining, at the server, a text manipulation action associated with each of the one or more recognized gestures;
   applying, at the server, for each of the one or more recognized gestures, the determined text manipulation action to a first value of a password input field to generate a second value, wherein the password input field being a constructed password field in a memory of the server;
   wherein the determined text manipulation action comprises at least one of:
      a. combining at least one of the password fragments with the first value at a cursor position in the first value;
      b. changing the cursor position in the first value;
      c. changing one or more characters in the first value; and
      d. reordering one or more characters in the first value.

2. The method of claim 1 where the one or more user inputs comprise at least one of touch inputs, motion inputs, mouse inputs, physical keyboard inputs and virtual keyboard inputs.

3. The method of claim 1 where the password input field is presented on a graphical user interface of a device as part of a password-based user authentication procedure.

4. The method of claim 1 wherein the password is constructed by successively applying, to the password input field, the text manipulation actions for each of the one or more recognized gestures, and the password so constructed is used to authenticate a user of a device.

5. The method of claim 1 wherein the determined text manipulation actions comprises a plurality of:
   a. combining at least one of the password fragments with the first value at a cursor position in the first value;
   b. changing the cursor position in the first value;
   c. changing one or more characters in the first value; and
   d. reordering one or more characters in the first value.

6. The method of claim 1 wherein the one or more received user inputs comprise conventional keyboard-based text inputs as well as gestures, and the user inputs are differentiated as such based on the characteristics of the user input.

7. The method of claim 1 where the one or more received user inputs comprise conventional keyboard-based text inputs as well as gestures, and the password is constructed by a combination of convention keyboard-based text input and gesture-based input, wherein:
   the password is constructed by successively applying, to the contents of the password input field,
      either the text manipulation actions associated with each one or more recognized gestures, if the one or more user inputs constitute one or more recognizable gestures,
      or the text corresponding for each of the conventional keyboard-based text inputs if the one or more user inputs constitute conventional keyboard-based text input;
   and the password so constructed to authentication a user of a device.

8. The method of claim 1 wherein the receiving of one or more user inputs, the recognizing of one or more gestures from the one or more received user inputs, and the applying of a determined text manipulation action to the password input field is performed at the server only if a device is determined to be an authorized device.

9. The method of claim 1 wherein the determining of text manipulation actions associated with the one or more recognized gestures is performed by looking up the recognized gesture in an associative data structure that maintains an association of recognized gestures to assigned text manipulation actions.

10. The method of claim 9 wherein the associative data structure maintaining the association of recognized gestures to assigned text manipulation actions is selected from a collection of one or more such associative data structures.

11. The method of claim 10 wherein the associative data structure maintaining the association of recognized gestures to assigned text manipulation actions is selected from a collection of one or more such associative data structures based on one or more contextual parameters.

12. The method of claim 11 wherein the one or more contextual parameters comprise one or more of: an identifier of the user providing the user inputs; a username entered in association with the password input field; a URL or domain name of a website providing the webpage containing the password input field; an identifier or type of an application presenting the password input field; an identifier or type of the protected resource being protected by the password; and a location of a device receiving the user inputs.

13. The method of claim 1 wherein text manipulation actions are associated with gestures as part of a pre-configuration procedure, whereby:
 a user assigns a text manipulation action to each of one or more gestures, the assignment being recorded in an associative data structure associating gestures with assigned text manipulation actions;
 and wherein the associative data structure is used to determine the text manipulation action associated with a recognized gesture.

14. The method of claim 13 wherein the pre-configuration procedure whereby a user may assign a text manipulation action to each of one or more gestures further comprises generating decoy text manipulation actions and assigning these decoy text manipulation actions to gestures that have not been assigned any text manipulation actions by the user.

15. A computer-implemented method of translating gestures to password inputs, the method comprising:
 receiving one or more user inputs, the one or more user inputs being detected via physical sensors deposited on a device;
 recognizing one or more gestures based on the received user inputs;
 determining a text manipulation action associated with each of the one or more recognized gestures;
 applying, for each of the one or more recognized gestures, the determined text manipulation action to the contents of a password input field;
 wherein the one or more user inputs are received at the device on which the sensors are deposited, the device being a client device, and wherein:
 the one or more user inputs received at the client device are transmitted via a network connection to a remote server computer, the remote server computer comprising a controller, a communications interface and a memory;
 the remote server computer receives the transmitted one or more user inputs;
 and the remote server computer is configured to perform the recognizing of one or more gestures based on the received transmitted one or more user inputs, the determining of the text manipulation action associated with each gesture input, and the applying, for each of the one or more recognized gestures, the determined text manipulation action to the contents of the password input field, the password input field being a constructed password field in the memory of the remote server computer.

16. The method of claim 15 wherein the one or more gestures recognized by the remote server are transmitted back to the client device.

17. The method of claim 15 wherein the one or more received transmitted user inputs also comprise conventional keyboard-based text inputs, and a password is constructed by a combination of conventional keyboard-based input and gesture-based input, whereby:
 the password is constructed by successively applying, to the contents of the constructed password field in the memory of the remote server computer,
  either the text manipulation actions associated with each of the one or more recognized gestures, if the received transmitted one
  or more user inputs constitute one or more recognizable gestures, or the text corresponding for each of the conventional keyboard-based text inputs if the received transmitted one or more user inputs constitute conventional keyboard-based input;
 and the password so constructed is used to authenticate a user of the device.

18. A non-transitory computer-readable storage medium having stored thereupon instructions for instructing a controller of a computer to perform steps for translating gestures to a password, said password partitioned into a plurality of password fragments, the number of password fragments being lesser than the number of characters in the password, the steps comprising:
 at a server, receiving, via a network connection, data representing one or more user inputs comprising sequences of user input coordinates;
 recognizing, at the server, one or more gestures based on the received user inputs;
 determining, at the server, a text manipulation action associated with each of the one or more recognized gestures;
 applying, at the server, for each of the one or more recognized gestures, the determined text manipulation action to a first value of a password input field to generate a second value, wherein the password input field being a constructed password field in a memory of the server;
 wherein the determined text manipulation action comprises at least one of:
  a. combining at least one of the password fragments with the first value at a cursor position in the first value;
  b. changing the cursor position in the first value;
  c. changing one or more characters in the first value; and
  d. reordering one or more characters in the first value.

* * * * *